United States Patent
Mukhopadhyay et al.

(10) Patent No.: US 10,901,721 B2
(45) Date of Patent: Jan. 26, 2021

(54) METHODS AND APPARATUS FOR VERSION ALIASING MECHANISMS AND CUMULATIVE UPGRADES FOR SOFTWARE LIFECYCLE MANAGEMENT

(71) Applicant: VMware, Inc., Palo Alto, CA (US)

(72) Inventors: Sudipto Mukhopadhyay, Palo Alto, CA (US); Swapneel Ambre, Palo Alto, CA (US); Akshay Mirajkar, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/264,227

(22) Filed: Jan. 31, 2019

(65) Prior Publication Data

US 2020/0097279 A1 Mar. 26, 2020

Related U.S. Application Data

(60) Provisional application No. 62/734,126, filed on Sep. 20, 2018.

(51) Int. Cl.
*G06F 9/445* (2018.01)
*G06F 8/65* (2018.01)
(Continued)

(52) U.S. Cl.
CPC .................. *G06F 8/65* (2013.01); *G06F 8/61* (2013.01); *G06F 8/62* (2013.01); *G06F 8/70* (2013.01);
(Continued)

(58) Field of Classification Search
CPC ...... G06F 16/1824; G06F 16/183; G06F 8/65; G06F 8/62; G06F 9/508; G06F 9/4856; G06F 21/6218
See application file for complete search history.

(56) References Cited

U.S. PATENT DOCUMENTS 7,389,300 B1   6/2008  Shah et al.
7,574,491 B2   8/2009  Stein et al.
(Continued)

FOREIGN PATENT DOCUMENTS

EP    1521172    4/2005

OTHER PUBLICATIONS

Luiz Andre Barroso et al., The Datacenter as a Computer, 2009, [Retrieved on Aug. 6, 2020]. Retrieved from the internet: <URL: https://www.morganclaypool.com/doi/pdf/10.2200/S00193ED1V01y200905CAC006> 120 Pages (1-107) (Year: 2009).*
(Continued)

*Primary Examiner* — Anibal Rivera
(74) *Attorney, Agent, or Firm* — Hanley, Flight & Zimmerman, LLC

(57) ABSTRACT

Methods and apparatus for version aliasing mechanisms and cumulative upgrades for software lifecycle management are disclosed. An example method includes cumulating, by executing an instruction with a processor, a plurality of software updates identified in a first manifest file with a plurality of software updates identified in a second manifest file, the second manifest file corresponding to a version older than a version corresponding to the first manifest file; and flagging the cumulative manifest files as cumulative, the cumulative manifest file containing a plurality of software updates that update the old version to the new version.

22 Claims, 15 Drawing Sheets

(51) Int. Cl.
*G06F 8/61* (2018.01)
*G06F 9/48* (2006.01)
*G06F 8/70* (2018.01)
*G06F 8/71* (2018.01)
*G06F 21/62* (2013.01)
*G06F 9/455* (2018.01)
*G06F 9/50* (2006.01)

(52) U.S. Cl.
CPC ............... *G06F 8/71* (2013.01); *G06F 9/455* (2013.01); *G06F 9/4856* (2013.01); *G06F 9/5055* (2013.01); *G06F 21/6218* (2013.01)

(56) References Cited

U.S. PATENT DOCUMENTS

| | | | |
|---|---|---|---|
| 8,171,485 B2 | 5/2012 | Muller | |
| 8,689,054 B1 | 4/2014 | van der Goot | |
| 8,997,098 B2 | 3/2015 | Lee et al. | |
| 9,176,764 B1 | 11/2015 | Jorgensen | |
| 9,325,791 B1* | 4/2016 | Blahaerath | G06F 3/0631 |
| 9,383,988 B2* | 7/2016 | Rychikhin | G06F 8/65 |
| 9,830,142 B2* | 11/2017 | Thomas | G06F 8/65 |
| 2001/0029605 A1 | 10/2001 | Forbes et al. | |
| 2003/0204603 A1 | 10/2003 | Buchannan et al. | |
| 2004/0187103 A1 | 9/2004 | Wickham et al. | |
| 2005/0044220 A1 | 2/2005 | Madhavan | |
| 2006/0156041 A1 | 7/2006 | Zaretsky et al. | |
| 2006/0184349 A1 | 8/2006 | Goud et al. | |
| 2007/0027973 A1 | 2/2007 | Stein et al. | |
| 2008/0201705 A1 | 8/2008 | Wookey | |
| 2009/0249284 A1 | 10/2009 | Antosz et al. | |
| 2009/0249354 A1 | 10/2009 | Yamaguchi et al. | |
| 2009/0290501 A1 | 11/2009 | Levy et al. | |
| 2009/0328030 A1 | 12/2009 | Fries | |
| 2010/0042723 A1 | 2/2010 | Sundarrajan et al. | |
| 2010/0070784 A1 | 3/2010 | Gupta et al. | |
| 2010/0106813 A1 | 4/2010 | Voutilainen et al. | |
| 2010/0114826 A1 | 5/2010 | Voutilainen et al. | |
| 2010/0235688 A1 | 9/2010 | Bennah et al. | |
| 2011/0029669 A1 | 2/2011 | Chuang et al. | |
| 2011/0113421 A1* | 5/2011 | Ewington | G06F 8/658 717/174 |
| 2011/0153697 A1 | 6/2011 | Nickolov et al. | |
| 2012/0166390 A1 | 6/2012 | Merriman et al. | |
| 2012/0179466 A1 | 7/2012 | Huang et al. | |
| 2012/0249588 A1 | 10/2012 | Tison et al. | |
| 2012/0266156 A1* | 10/2012 | Spivak | H04L 67/34 717/172 |
| 2012/0266166 A1 | 10/2012 | Farkas et al. | |
| 2012/0303767 A1 | 11/2012 | Renzin | |
| 2013/0054734 A1* | 2/2013 | Bond | G06F 9/4856 709/217 |
| 2013/0067058 A1* | 3/2013 | Bohm | G06F 9/45504 709/224 |
| 2013/0185258 A1* | 7/2013 | Bestler | G06F 16/1844 707/638 |
| 2013/0305039 A1* | 11/2013 | Gauda | G06F 21/6218 713/153 |
| 2014/0013318 A1* | 1/2014 | Rychikhin | G06F 8/71 717/172 |
| 2014/0033193 A1* | 1/2014 | Palaniappan | G06F 21/57 717/173 |
| 2014/0075179 A1 | 3/2014 | Krishnapura et al. | |
| 2014/0082202 A1 | 3/2014 | Zhao | |
| 2014/0129699 A1 | 5/2014 | Jeftovic et al. | |
| 2014/0156850 A1 | 6/2014 | Hunt | |
| 2014/0173580 A1 | 6/2014 | McDonald et al. | |
| 2014/0181294 A1 | 6/2014 | Deshepande et al. | |
| 2014/0208314 A1* | 7/2014 | Jeswani | G06F 8/65 718/1 |
| 2014/0280975 A1 | 9/2014 | Mordani et al. | |
| 2014/0282520 A1 | 9/2014 | Sabharwal | |
| 2014/0297834 A1 | 10/2014 | Tripathi et al. | |
| 2014/0351809 A1 | 11/2014 | Chawla et al. | |
| 2014/0380308 A1 | 12/2014 | Hassine et al. | |
| 2015/0046572 A1 | 2/2015 | Cheng et al. | |
| 2015/0059006 A1 | 2/2015 | White | |
| 2015/0081572 A1* | 3/2015 | Thomas | G06Q 10/20 705/305 |
| 2015/0082292 A1* | 3/2015 | Thomas | G06F 8/62 717/168 |
| 2015/0082296 A1* | 3/2015 | Thomas | G06F 8/62 717/171 |
| 2015/0089496 A1 | 3/2015 | Thankappan et al. | |
| 2015/0113529 A1 | 4/2015 | Zhong | |
| 2015/0143380 A1 | 5/2015 | Chen et al. | |
| 2015/0149620 A1 | 5/2015 | Banerjee et al. | |
| 2015/0207752 A1 | 7/2015 | Birkestrand et al. | |
| 2015/0261578 A1 | 9/2015 | Greden et al. | |
| 2015/0286935 A1 | 10/2015 | Mukherjee et al. | |
| 2015/0317173 A1 | 11/2015 | Anglin et al. | |
| 2015/0358198 A1* | 12/2015 | Mahajan | H04L 67/32 709/221 |
| 2015/0378765 A1 | 12/2015 | Singh et al. | |
| 2016/0004696 A1 | 1/2016 | Trenkov et al. | |
| 2016/0117161 A1* | 4/2016 | Parthasarathy | G06F 8/65 717/171 |
| 2016/0191343 A1 | 6/2016 | Dong et al. | |
| 2016/0283221 A1 | 9/2016 | Kochar et al. | |
| 2016/0359872 A1* | 12/2016 | Yadav | H04L 43/0894 |
| 2017/0003951 A1* | 1/2017 | Newell | G06F 8/70 |
| 2017/0286093 A1* | 10/2017 | Steshenko | G06F 8/71 |
| 2017/0322794 A1* | 11/2017 | Ferlitsch | H04L 67/10 |
| 2018/0013791 A1* | 1/2018 | Healey | H04L 41/0863 |
| 2018/0025026 A1* | 1/2018 | Shaw, Jr. | G06F 16/183 707/626 |
| 2018/0373434 A1* | 12/2018 | Switzer | G06F 3/0617 |
| 2019/0205112 A1* | 7/2019 | Salameh | G06F 8/65 |

OTHER PUBLICATIONS

Arka A. Bhattacharya et al., The need for speed and stability in data center power capping, 2013, [Retrieved on Aug. 6, 2020]. Retrieved from the internet: <URL: https://pdf.sciencedirectassets.com/270493/1-s2.0-S2210537913X00046/1-s2.0-S2210537913000061/main.pdf?> 8 Pages (183-193) (Year: 2013).*
Vmware Infrastructure, "Resource Management with VMware DRS," copyright 1998-2006, VMware Inc., Palo Alto, California, 24 pages.
United States Patent and Trademark Office, "Non-Final Office Action," issued in connection with U.S. Appl. No. 14/788,210, dated Aug. 11, 2016, 17 pages.
VirtualRACK, An Inter Pole Enterprise, copyright 2009, http://www.virtualrack.in/, 1 page.
VirtualRACK, "VirtualRack Overview," An Inter Pole Enterprise, copyright 2009, http://www.virtualrack.in/overview.php, 1 page.
VirtualRACK, "Questions," An Inter Pole Enterprise, copyright 2009, http://www.virtualrack.in/questions.php, 3 pages.
VirtualRACK, "Why VirtualRack?," An Inter Pole Enterprise, copyright 2009, http://www.virtualrack.in/why-virtualrack.php, 2 pages.
Vmware, "Using the CIM Object Space," http://pubs.vmware.com/vsphere-55/index.jsp?topic=%2Fcom.vmware.cimsdk.smashpg.doc%02F03_CIM_SMASH_PG_Use_Cases.5.1.html, retrieved on Aug. 31, 2016, 1 page.
Cisco, "Proven Savings in IT Operations," http://www.cisco.com/c/en/us/products/servers-unified-computing/ucs-manager/index.html, retrieved on Aug. 31, 2016, 2 pages.
Cisco, "Servers—Unified Computing," http://www.cisco.com/c/en/us/products/servers-unified-computing/index.html, retrieved on Aug. 31, 2016, 3 pages.
Cisco, "Cisco UCS Faults and Error Messages Reference," http://www.cisco.com/c/en/us/td/docs/unified_computing/ucs/ts/faults/reference/ErrMess/UCS_SEMs.html, retrieved on Aug. 31, 2016, 125 pages.
Cisco, "Cisco UCS Manager Troubleshooting Reference Guide," Chapter: Troubleshooting Server Hardware Issues, http://www.cisco.com/c/en/us/td/docs/unified_computing/ucs/ts/guide/UCSTroubleshooting/UCSTroubleshooting_chapter_0111.html, retrieved on Aug. 31, 2016, 20 pages.

(56) References Cited

OTHER PUBLICATIONS

Cisco, "Cisco UCS C-Series Servers Integrated Management Controller CLI Configuration Guide, Release 1.3," http://www.cisco.com/c/en/us/td/docs/unified_computing/ucs/c/sw/cli/config/guide/131/b_Cisco_UCS_C-Series_CLI_Configuration_Guide_131.pdf, Mar. 11, 2011, 150 pages.
Intel, "IPMI, Intelligent Platform Management Interface Specification Second Generation V2.0," Feb. 12, 2004, http://www.intel.com/CONTENT/WWW/US/EN/SERVERS/IPMI/SECOND-GEN-INTERFACE-SPEC-V2-REV1-4.HTML, 590 pages.
The International Searching Authority, "Invitation to Pay Additional Fees," issued in connection with application No. PCT/US2016/040205, dated Oct. 20, 2016, 6 pages.
The International Searching Authority, "International Search Report and Written Opinion," issued in connection with application No. PCT/US2016/040205, dated Dec. 15, 2016, 19 pages.
United States Patent and Trademark Office, "Non-Final Office Action," issued in connection with U.S. Appl. No. 14/796,803, dated Feb. 22, 2017, 13 pages. (Copy not provided as this is a USPTO document. Applicant will provide document upon request from Examiner).
Pham et al., "An Evaluation of ZooKeeper for High Availability in System S," ICPE '14, Mar. 22, 2014, 11 pages.
United States Patent and Trademark Office, "Non-Final Office Action," issued in connection with U.S. Appl. No. 14/788,004, dated Jun. 5, 2017, 11 pages. (Copy not provided as this is a USPTO document. Applicant will provide document upon request from Examiner.).
United States Patent and Trademark Office, "Final Office Action," issued in connection with U.S. Appl. No. 14/796,803, dated May 22, 2017, 15 pages. (Copy not provided as this is a USPTO document. Applicant will provide document upon request from Examiner.).
United States Patent and Trademark Office, "Non-Final Office Action," issued in connection with U.S. Appl. No. 14/752,699, dated Aug. 29, 2017, 9 pages. (Copy not provided as this is a USPTO document. Applicant will provide document upon request from Examiner.).
United States Patent and Trademark Office, "Non-Final Office Action," issued in connection with U.S. Appl. No. 14/788,193 dated Sep. 25, 2017, 15 pages. (Copy not provided as this is a USPTO document. Applicant will provide document upon request from Examiner.).
United States Patent and Trademark Office, "Non-Final Office Action," issued in connection with U.S. Appl. No. 14/796,826 dated Oct. 13, 2017, 12 pages. (Copy not provided as this is a USPTO document. Applicant will provide document upon request from Examiner.).
United States Patent and Trademark Office, "Notice of Allowance," issued in connection with U.S. Appl. No. 14/796,803 dated Sep. 12, 2017, 18 pages. (Copy not provided as this is a USPTO document. Applicant will provide document upon request from Examiner.).
United States Patent and Trademark Office, "Non-Final Office Action," issued in connection with application No. 15/187,452, dated Aug. 30, 2017, 13 pages. (Copy not provided as this is a USPTO document. Applicant will provide document upon request from Examiner.).
United States Patent and Trademark Office, "Notice of Allowance," issued in connection with U.S. Appl. No. 14/796,826, dated May 15, 2018, 15 pages. (Copy not provided as this is a USPTO document. Applicant will provide document upon request from Examiner.).
United States Patent and Trademark Office, "Notice of Allowance," issued in connection with U.S. Appl. No. 14/752,699, dated Mar. 27, 2018, 9 pages. (Copy not provided as this is a USPTO document. Applicant will provide document upon request from Examiner.).
United States Patent and Trademark Office, "Notice of Allowance," issued in connection with U.S. Appl. No. 14/788,193, dated Mar. 22, 2018, 13 pages. (Copy not provided as this is a USPTO document. Applicant will provide document upon request from Examiner.).
United States Patent and Trademark Office, "Final Office Action," issued in connection with U.S. Appl. No. 15/187,452, dated Apr. 4, 2018, 19 pages. (Copy not provided as this is a USPTO document. Applicant will provide document upon request from Examiner.).
United States Patent and Trademark Office, "Notice of Allowance," issued in connection with U.S. Appl. No. 14/788,004, dated Apr. 9, 2018, 8 pages. (Copy not provided as this is a USPTO document. Applicant will provide document upon request from Examiner.).
European Patent Office, "First Examination Report," issued in connection with European application No. 16739341.2, dated Oct. 23, 2018 (10 pages).
United States Patent and Trademark Office, "Final Office Action," issued in connection with U.S. Appl. No. 15/187,452, dated Nov. 9, 2018, 13 pages. (Copy not provided as this is a USPTO document. Applicant will provide document upon request from Examiner.).
Dayal, Umeshwar et al., "Workflow Technologies Meet the Internet," Workflow Management Systems and Interoperability, pp. 423-438, Aug. 12, 1997, https://link.springer.com/chapter/10.1007%2F978-3-642-58908-9_19?LI=true, 2 pages.
European Patent Office, "Communication pursuant to Article 94(3) EPC," issued in connection with application No. 16739341.2 dated May 23, 2019, 8 pages.
United States Patent and Trademark Office, "Final Office Action," issued in connection with U.S. Appl. No. 15/187,480, dated Aug. 6, 2019, 25 pages. (Copy not provided as this is a USPTO document. Applicant will provide document upon request from Examiner.).
United States Patent and Trademark Office, "Non-Final Office Action," issued in connection with U.S. Appl. No. 15/187,480, dated Dec. 12, 2018, 23 pages. (Copy not provided as this is a USPTO document. Applicant will provide document upon request from Examiner.).
United States Patent and Trademark Office, "Advisory Action," issued in connection with U.S. Appl. No. 15/187,452, dated Sep. 3, 2019, 8 pages. (Copy not provided as this is a USPTO document. Applicant will provide document upon request from Examiner.).
United States Patent and Trademark Office, "Final Office Action," issued in connection with U.S. Appl. No. 15/187,452, dated May 30, 2019, 21 pages. (Copy not provided as this is a USPTO document. Applicant will provide document upon request from Examiner.).
United States Patent and Trademark Office, "Final Office Action," issued in connection with U.S. Appl. No. 15/187,480, dated Jul. 13, 2018, 26 pages. (Copy not provided as this is a USPTO document. Applicant will provide document upon request from Examiner.).
United States Patent and Trademark Office, "Non-Final Office Action," issued in connection with U.S. Appl. No. 15/187,480, dated Nov. 8, 2017, 25 pages. (Copy not provided as this is a USPTO document. Applicant will provide document upon request from Examiner.).
United States Patent and Trademark Office, "Non-Final Office Action," issued in connection with U.S. Appl. No. 15/187,480, dated Nov. 18, 2019, 24 pages. (Copy not provided as this is a USPTO document. Applicant will provide document upon request from Examiner.).
United States Patent and Trademark Office, "Notice of Allowance and Fees(s) Due," issued in connection with U.S. Appl. No. 15/187,452, dated Nov. 18, 2019, 5 pages. (Copy not provided as this is a USPTO document. Applicant will provide document upon request from Examiner.).

\* cited by examiner

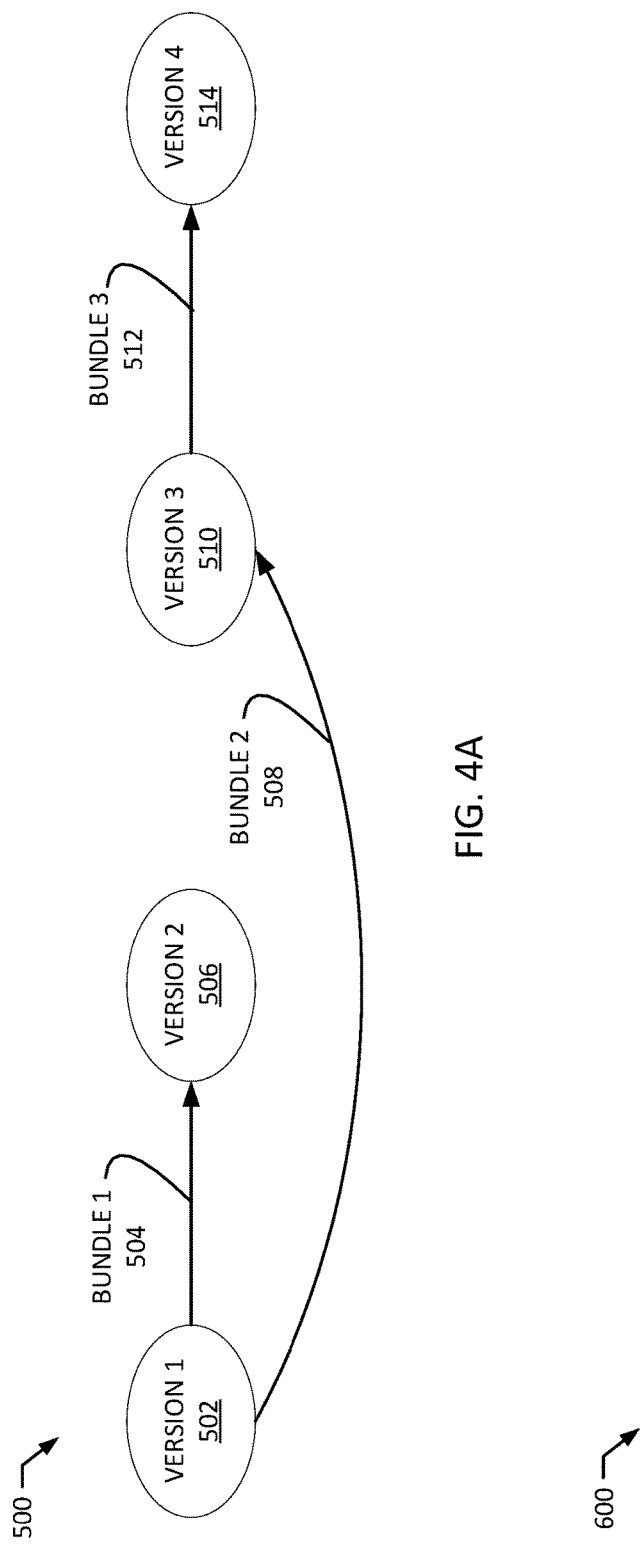
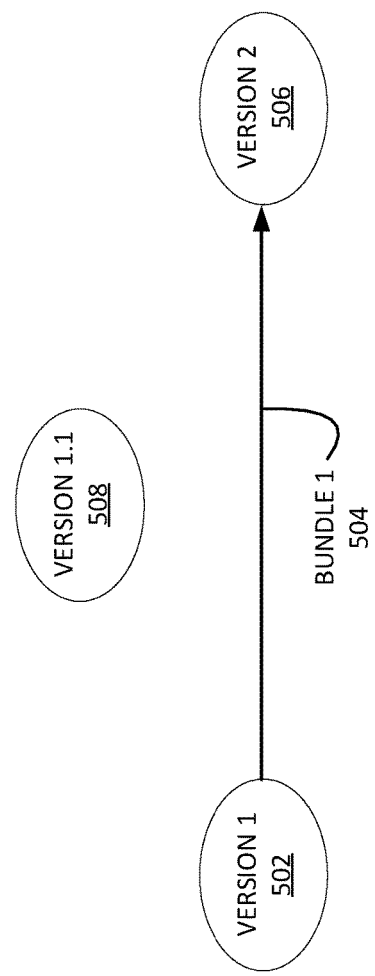
FIG. 4A
FIG. 4B

US 10,901,721 B2

METHODS AND APPARATUS FOR VERSION ALIASING MECHANISMS AND CUMULATIVE UPGRADES FOR SOFTWARE LIFECYCLE MANAGEMENT

RELATED APPLICATION

This patent arises from a continuation of U.S. Patent Application Ser. No. 62/734,126, which was filed on Sep. 20, 2018. U.S. Patent Application Ser. No. 62/734,126 is hereby incorporated herein by reference in its entirety. Priority to U.S. Patent Application Ser. No. 62/734,126 is hereby claimed.

FIELD OF THE DISCLOSURE

This disclosure relates generally to virtual computing environments and, more particularly, to version aliasing mechanisms and cumulative upgrades for software lifecycle management of a virtual computing environment.

BACKGROUND

Virtualizing computer systems provides benefits such as the ability to execute multiple computer systems on a single hardware computer, replicating computer systems, moving computer systems among multiple hardware computers, and so forth. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

FIG. 4A is a block diagram of an example directed acyclic graph implementing the path traverser block of the lifecycle manager.

FIG. 4B is a block diagram of an example directed acyclic graph implementing the example version aliaser of the lifecycle manager.

DETAILED DESCRIPTION

Figure 1A:
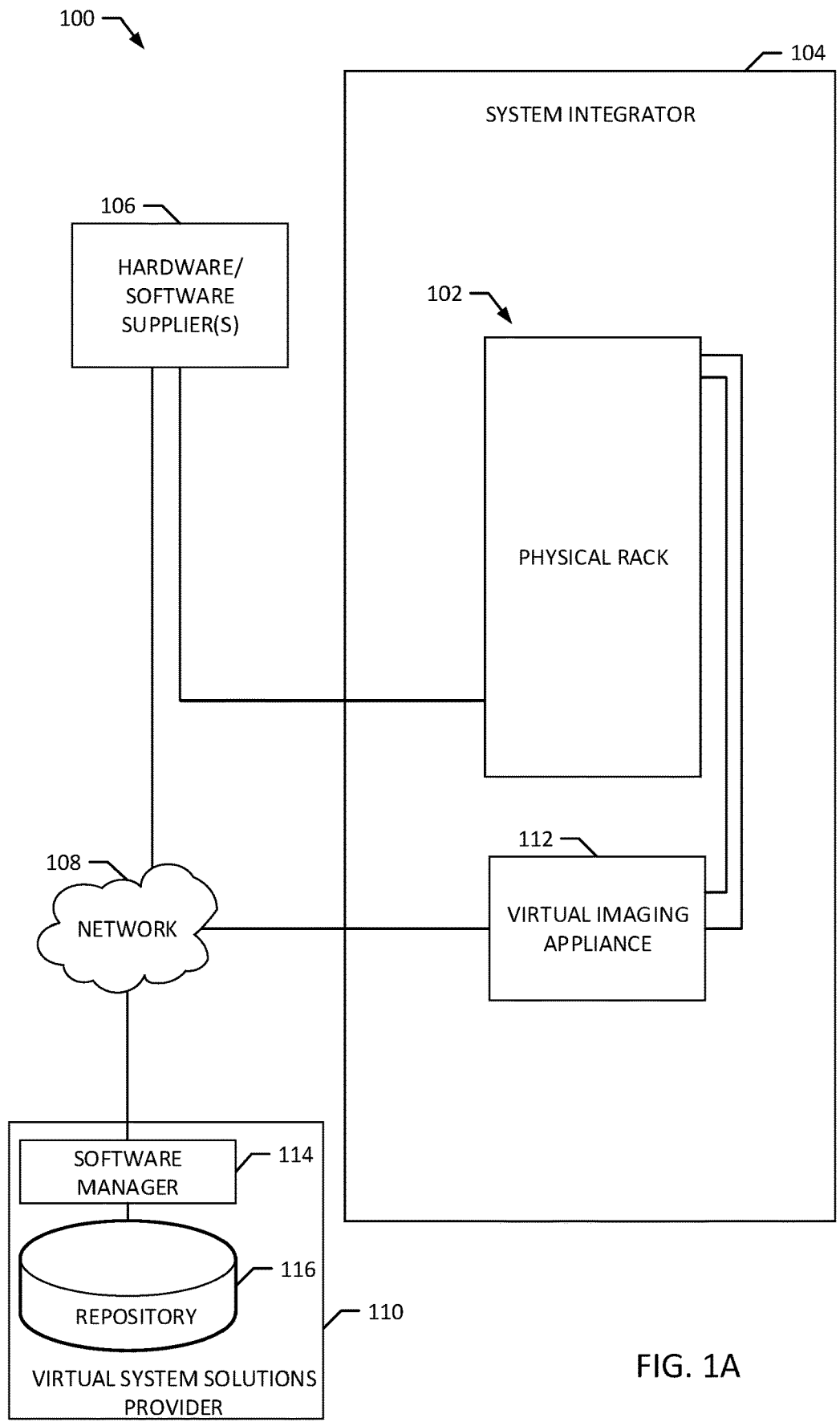
FIG. 1A is a block diagram of an example environment in which a physical rack is prepared by an example system integrator for distribution to a customer.

Cloud computing is based on the deployment of many physical resources across a network, virtualizing the physical resources into virtual resources, and provisioning the virtual resources for use across cloud computing services and applications. During the lifecycle of a cloud computing environment, the SDDC infrastructure components (e.g., ESX, vCenter®, vSAN, vSphere, etc) are upgraded from one supported version to another in a very specific and prescriptive manner. This ensures that at any given time during the lifecycle, all the SDDC infrastructure components are running at thoroughly tested and supported versions that are compatible with each other. However, data center operators often come across a trade-off during the upgrading of customer workloads, the trade-off being a guarantee that the customer workloads will not be impacted or interfered with during an upgrade, but that there will be a cost in terms of time it takes to make the upgrade and/or schedule a maintenance window for the upgrade. In other occasions, during the lifecycle of a cloud computing environment, there might be a "hot patch" release (a set of changes to a system to improve, update, or fix the system while the system is running) for an infrastructure component. A system administrator at the customer premise may have to release the hot patch directly due to time it might take the data center operator to release the patch. Therefore, the customer workloads would be operating on an intermediate version, not supported by the lifecycle manager. Examples disclosed herein help reduce the aforementioned costs associated with infrastructure component upgrading/scheduling. Examples disclosed herein also help support the lifecycle management of the data center's infrastructure components that have been upgraded via a mechanism not supported by the lifecycle manager and running at an intermediate version.

Example methods and apparatus disclosed herein facilitate managing the software lifecycle for data center computing elements. For example, the methods and apparatus facilitate updating, patching, upgrading, etc. the multiple hardware elements that implement a computing element in a cluster of computing elements (e.g., a computing element may be a self-contained physical rack of multiple computing components (e.g., network switches, processors, storage, etc.) that may be joined with other self-contained physical racks to form a cloud or cluster of computing resources). In many computing environments it is undesirable to interrupt, interfere, etc. with the operation of the computing environment (e.g., the computing environment may operate 24 hours a day and may have no natural down time during which systems can be taken offline for maintenance). Example methods and apparatus facilitate scheduling and performing such updating, patching, upgrading, etc. by utilizing redundant and/or offline/spare computing resources and by continually cumulating those computing resources when new ones are available, to reduce and/or eliminate the impact on the operating computing environment as well as reducing the time it takes to do so. Example methods and apparatus facilitate a continuation of such updating, patching, upgrading, etc. in instances where the hardware elements that implement a computing element in a cluster of computing elements have been updated, patched, upgraded, etc. by an intermediate mechanism.

Figure 1B:
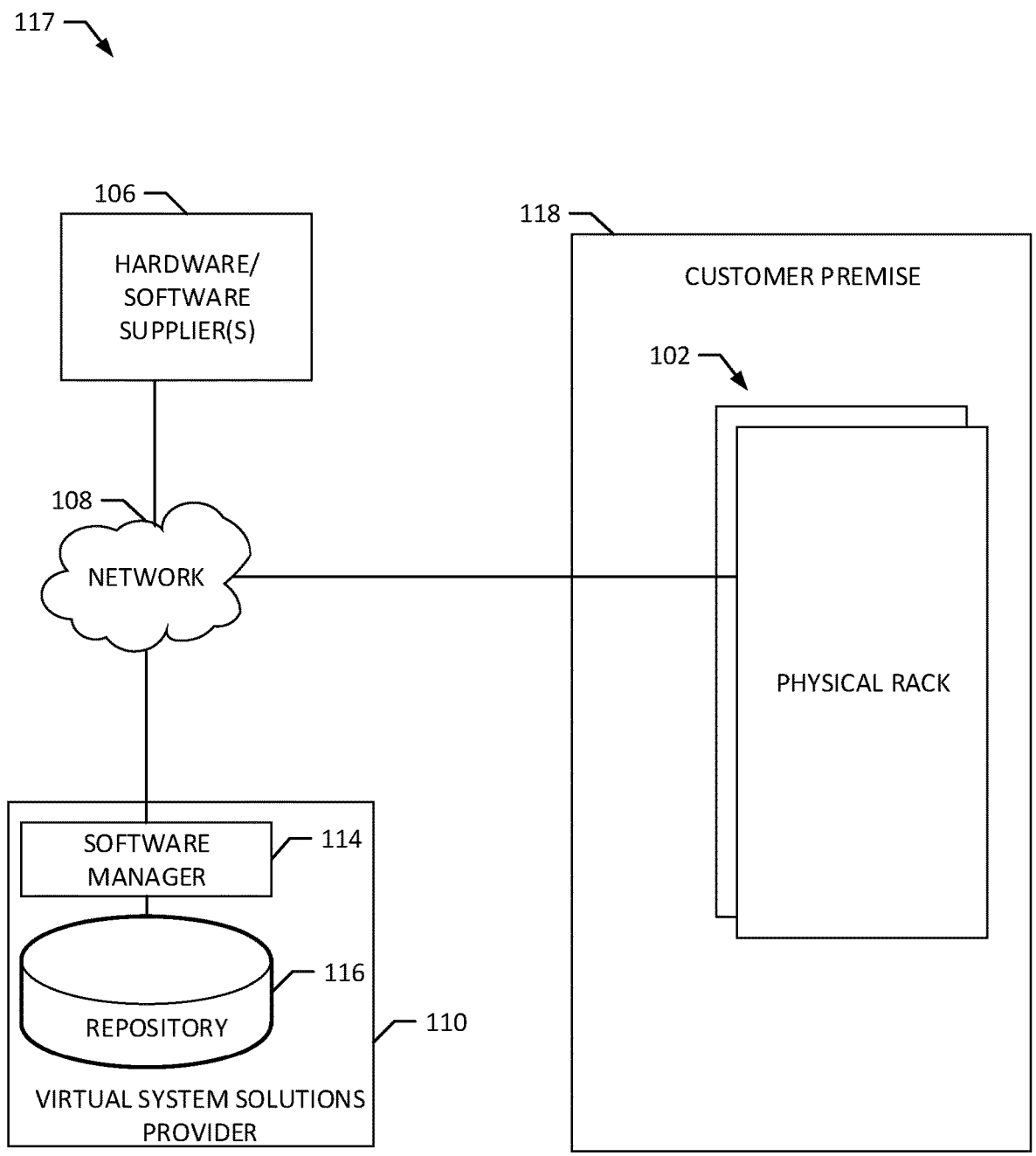
FIG. 1B is a block diagram of an example environment in which an example physical rack is deployed at an example customer premise.

FIG. 1A depicts an example environment 100 in which a physical rack 102 is prepared by an example system integrator 104 for distribution to a customer. FIG. 1B depicts an example environment 117 in which the example physical rack 102 is deployed at an example customer premise 118.

The example environment 100 of FIG. 1 includes the example physical rack 102, an example system integrator 104, an example hardware/software supplier(s) 106, an example network 108, an example virtual system solutions provider 110, and an example virtual imaging appliance 112.

The system integrator 104 of the illustrated example receives and fulfills customer orders for computing hardware. The system integrator 104 of the example of FIG. 1A obtains computer hardware and/or software from other suppliers, such as the example hardware/software supplier(s) 106, and assembles individual hardware components and/or software into functional computing units to fulfill customer orders. Alternatively, the system integrator 104 may design and/or build some or all of the hardware components and/or software to be used in assembling computing units. According to the illustrated example, the system integrator 104 prepares computing units for other entities (e.g., businesses and/or persons that do not own/employ and are not owned/employed by the system integrator 104). Alternatively, the system integrator 104 may assemble computing units for use by the same entity as the system integrator 104 (e.g., the system integrator 104 may be a department of a company, wherein the company orders and/or utilizes the assembled computing units). As used herein, the term customer refers to any person and/or entity that receives and/or operates the computing units supplied by the system integrator 104. In some examples, the system integrator 104 is an entity independent of equipment manufacturers such as white-label equipment manufacturers that provide hardware without branding. In other examples, the system integrator 104 is an original equipment manufacturer (OEM) partner or original device manufacturer (ODM) partner that partners with OEMs or ODMs (e.g., non-white label equipment manufacturers) that provide brand-labeled hardware. Example OEM/ODM hardware includes OEM/ODM Servers such as Hewlett-Packard® (HP) servers and Lenovo® servers, and OEM/ODM Switches such as Arista switches, and/or any other OEM/ODM servers, switches, or equipment that are labeled by the original manufacturers.

According to the illustrated example, one type of computing unit ordered from and/or assembled by the example system integrator 104 is the physical rack 102. The physical rack 102 is a combination of computing hardware and installed software that may be utilized by a customer to create and/or add to a virtual computing environment. For example, the physical rack 102 may include processing units (e.g., multiple blade servers), network switches to interconnect the processing units and to connect the physical rack 102 with other computing units (e.g., other ones of the physical rack 102 in a network environment such as a cloud computing environment), and/or data storage units (e.g., network attached storage, storage area network hardware, etc.). The physical rack 102 of the illustrated example is prepared by the system integrator 104 in a partially configured state to enable the computing devices to be rapidly deployed at a customer location (e.g., in less than 2 hours). For example, the system integrator 104 may install operating systems, drivers, operations software, management software, etc. The installed components may be configured with some system details (e.g., system details to facilitate intercommunication between the components of the physical rack 102) and/or may be prepared with software to collect further information from the customer when the virtual server rack is installed and first powered on by the customer.

To facilitate preparation of the physical rack 102 for distribution to a customer, the example system integrator 104 utilizes the virtual imaging appliance 112 to prepare and configure the operating systems, system configurations, software, etc. on the physical rack 102 prior to shipping the example server rack 102 to the customer. The virtual imaging appliance 112 of the illustrated example is a virtual computing appliance provided to the system integrator 104 by the example virtual system solutions provider 110 via the example network 108. The example virtual imaging appliance 112 is executed by the example system integrator 104 in a virtual computing environment of the system integrator 104. For example, the virtual imaging appliance 112 may be a virtual computing image, a virtual application, a container virtual machine image, a software application installed in an operating system of a computing unit of the system integrator 104, etc. The virtual imaging appliance 112 may alternatively be provided by any other entity and/or may be a physical computing device, may be multiple physical computing devices, and/or may be any combination of virtual and physical computing components.

The virtual imaging appliance 112 of the illustrated example retrieves software images and configuration data from the virtual systems solutions provider 110 via the network 108 for installation on the physical rack 102 during preparation of the physical rack 102. The virtual imaging appliance 112 of the illustrated example pushes (e.g., transmits, sends, etc.) the software images and configuration data to the components of the physical rack 102. For example, the virtual imaging appliance 112 of the illustrated example includes multiple network connections (e.g., virtual network connections, physical network connects, and/or any combination of virtual and network connections). For example, the virtual imaging appliance 112 of the illustrated examples connects to a management interface of a network switch(es) installed in the physical rack 102, installs network configuration information on the network switch(es), and reboots the switch(es) to load the installed configuration to communicatively couple the virtual imaging appliance 112 with the computing unit(s) communicatively coupled via the network switch(es). The example virtual imaging appliance 112 also connects to a management network interface (e.g., an out of band (OOB) interface) of a server(s) installed in the example physical rack 102 to cause an operating system(s) to be installed (e.g., utilizing a preboot execution environment (PXE) boot of an operating system installer). The example virtual imaging appliance 112 is also used to install virtual environment management components (described in further detail in conjunction with FIG. 3 and in the following pages) and causes the virtual environment management components to boot so that they can take over the deployment of the example server rack 102.

The example virtual imaging appliance 112 is configured to perform many operations of the deployment without user intervention and without the need for a user of the example system integrator 104 to manually connect to the various interfaces of the components of the example physical rack 102. Furthermore, the user of the example virtual imaging appliance 112 is freed from the burden of locating the various software images that may be needed to configure the example physical rack 102 (e.g., firmware images for the network switch(es), operating system images for the server(s), operating system driver(s) for hardware components installed in the physical rack 102, etc.). Additionally, the virtual environment management components deployed by the example virtual imaging appliance 112 are configured by the virtual imaging appliance 112 to facilitate easy deployment of the physical rack 102 at the customer location. For example, the virtual management components installed on the physical rack 102 by the example virtual imaging appliance 112 include graphical user interfaces that guide a customer through the process of inputting configuration parameters (e.g., details of the customer's network, information about existing virtual environments, etc.). In addition, the example virtual management components automatically discover some information about the customer's system (e.g., automatically discover information about existing virtual environments).

The network 108 of the illustrated example communicatively couples the example system integrator 104 with the virtual system solutions provider 110 and communicatively couples the example hardware/software suppliers 106 with the example virtual system solutions provider 110. According to the illustrated example, the network 108 is the Internet. Alternatively, the network 108 may be any type of local network, wide area network, wireless network, wired network, any combination of networks, etc. While the network 108 of FIG. 1A is illustrated as a single network, the network may be any number and/or type of network. For example, the network 108 may be implemented by one or more of a local area network, a wide area network, a wireless network, a wired network, a virtual network, etc.

Referring to FIG. 1B, the example customer premise 118 is a location at which the example physical rack 102 (e.g., multiple ones of the physical rack 102 are deployed). For example, the customer premise 118 may be a data center, a location of a cloud provider, a business location, or any other location that wishes to implement a virtual computing environment comprised of one or more of the physical rack(s) 102. According to the illustrated example, the example customer premise 118 (and the example physical(s) rack 102 located at the example customer premise 118) is communicatively coupled to the example network 108 to communicatively couple the example customer premise 118 with the example virtual system solutions provider 110.

The virtual system solutions provider 110 of the illustrated example distributes (e.g., sells) and/or supports the example virtual imaging appliance 112. The virtual system solutions provider 110 of the illustrated example also provides a repository 116 of images and/or other types of software (e.g., virtual machine images, drivers, operating systems, etc.) that may be retrieved by A) the virtual imaging appliance 112 and installed on the physical rack 102 and/or B) retrieved by the example physical rack 102 after the example physical rack 102 is deployed at an example customer premise 118 (as illustrated in FIG. 1B). The virtual system solutions provider 110 may alternatively be implemented by multiple entities (e.g., from a manufacturer(s) of the software) and/or any other type of entity.

The example virtual system solutions provider 110 of the illustrated example of FIGS. 1A and 1B includes an example software manager 114 and the example repository 116. Together, the example software manager 114 and the example repository 116 provide software to A) the example virtual imaging appliance 112 of FIG. 1A for provisioning the example physical rack 102 at the example system integrator 104 and/or B) to the example physical rack(s) 102 of FIG. 1B at the example customer premise 118 for updating, upgrading, patching, etc. the computing resources included in the example physical rack(s) 102.

The example software manager 114 receives software from the example hardware/software supplier(s) 106 and stores the data in the example repository 116. The software may include new and/or updated drivers, operating systems, firmware, etc. for computing resources included in the example physical rack 102. For example, the software may include a firmware/operating system of a network switch installed in the physical rack 102, a hypervisor for execution on server hardware installed in the physical rack 102, a driver for a storage device installed in the physical rack 102, a security update for an operating system installed in the computing environment provided by the physical rack 102, etc.

The example software manager 114 receives requests for rack installation images from the example virtual imaging appliance 112, retrieves the requested image(s), and transfers the requested image(s) to the example virtual imaging appliance 112 via the network 108 to facilitate installation of the image(s) on the example physical rack 102 by the example virtual imaging appliance 112. The example software manager 114 may additionally provide updated image(s) to the example virtual imaging appliance 112 following the receipt of updated software from the example hardware/software supplier(s) 106. For example, the example virtual imaging appliance 112 may periodically send requests for updated image(s) and/or the example software manager 114 may notify the example virtual imaging appliance 112 when an updated image has been prepared (e.g., after new software has been received, tested, and added to a new image).

The example software manager 114 also receives requests for updated software from the example physical rack 102 after the example physical rack 102 has been deployed at the example customer premise 118. For example, when the example physical rack 102 is deployed as a part of a cluster of physical racks 102 at the example customer premise 118, one of the physical racks 102 may periodically send requests for updated software bundles (e.g., a group of software that includes software associated with the plurality of computing resources installed in the example physical rack 102). In response to such requests, the example software manager 114 retrieves a manifest file that includes a bundle version so that the physical rack 102 may determine if the bundle includes software that is newer, updated, improved, etc. relative to the software currently installed on the computing resources of the example physical rack 102. For example, if the manifest file identifies a version that is newer than a version of a bundle of software currently installed on the example physical rack 102, the bundle includes new software (e.g., a new firmware that has been selected for installation on a network switch installed in the example physical rack 102). In some instances, the virtual system solutions provider 110 may support multiple different physical rack implementations (e.g., different combinations of computing resources and/or software installed in the example physical rack 102). In such instances, the manifest file may additionally include an identifier of the particular combination of components in the example physical rack 102. For example, the manifest file may identify a stock-keeping unit (SKU) associated with the example physical racks 102 to allow the physical rack 102 to confirm that a received manifest file identifies software for the particular physical rack 102.

The example software manager 114 also may cumulate the software bundles retrieved from the example hardware/software suppliers 106 (e.g., combine all the new software since last major update). The cumulative bundles are cumulated for quicker version updates. For example, if the sequential update order for each version is version 1, version 2, version 3, and version 4 then each version has an associated bundle to get to the target version (e.g., version 1 has a bundle 1 that updates version 1 to version 2, and version 2 has a bundle 2 that updates version 2 to version 3, and version 3 has a bundle 3 that updates version 3 to version 4, and so on). The example software manager 114 cumulates each bundle so that the software contained in the bundle contains software in previous bundle (e.g., the bundle 3 contains all the software from bundles 1 and 2).

The example software manager 114 also may also receive intermediate version data from the example physical rack 102 after the example physical rack 102 has been deployed at the example customer premise 118. For example, the example physical rack 102 deployed at the example customer premise 118 may receive intermediate version data that provides the software manager 114 a look-up table of possible intermediate versions, of an SDDC infrastructure component, that may correspond to a version of that component that the SDDC manager supports (e.g., the intermediate version data for intermediate version 1.1 may include data that informs the software manager 114 that intermediate version 1.1 corresponds to version 1 of an SDDC infrastructure component).

Figure 3:
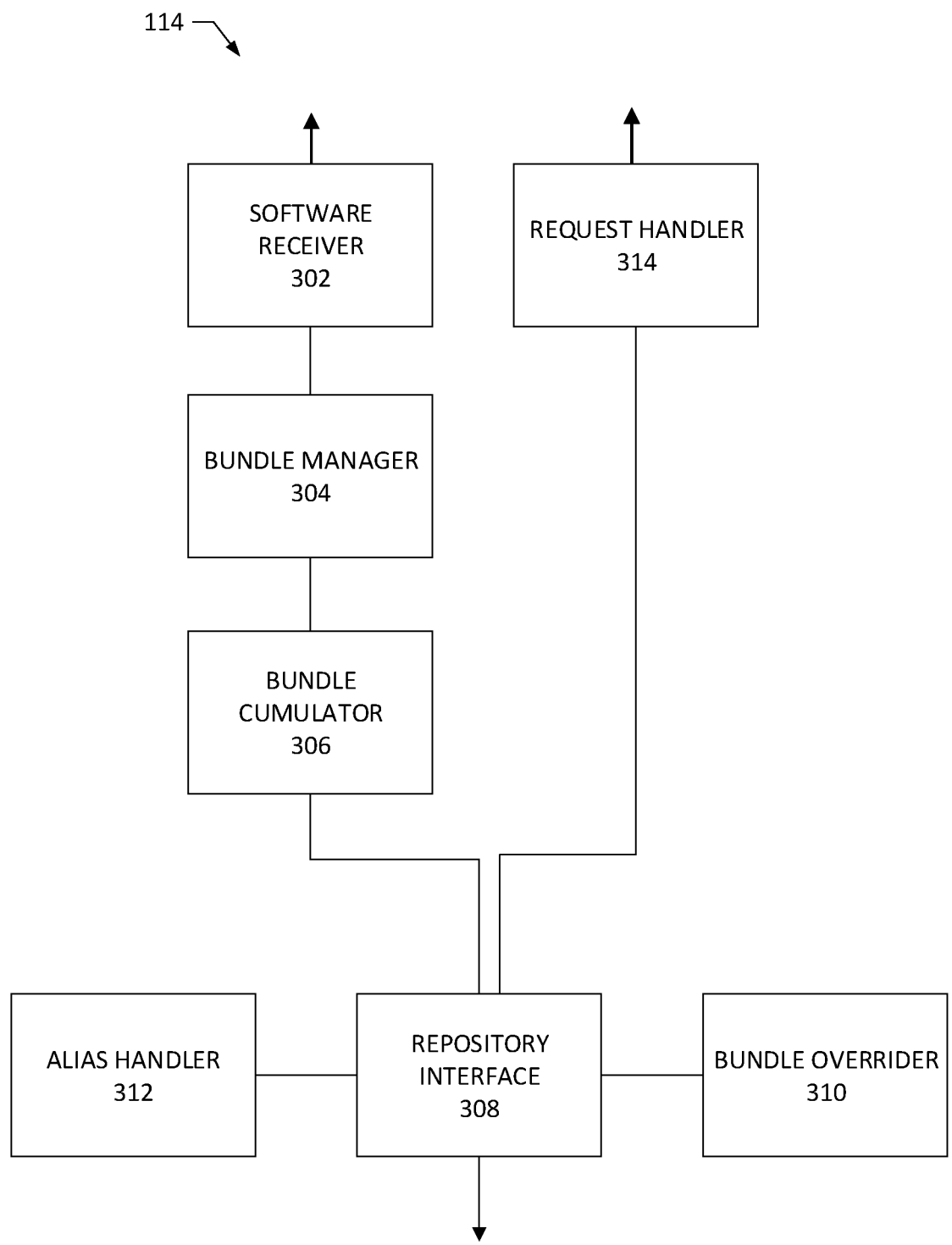
FIG. 3 is a block diagram of an example implementation of the software manager of FIG. 1A and/or FIG. 1B

An example implementation of the example software manager 114 is described in conjunction with FIG. 3.

The example repository 116 stores software received from the example hardware/software supplier(s) 106 and manifest files generated by the example software manager 114 for the example software. The repository 116 of the illustrated example is communicatively coupled with the example software manager 114 to allow the example software manager 114 to store and retrieve software. The example repository 116 is a database. Alternatively, the example repository may be any other type of storage such as, for example, a network attached storage, a hard drive, a shared network drive, a file, a folder, etc.

Figure 2:
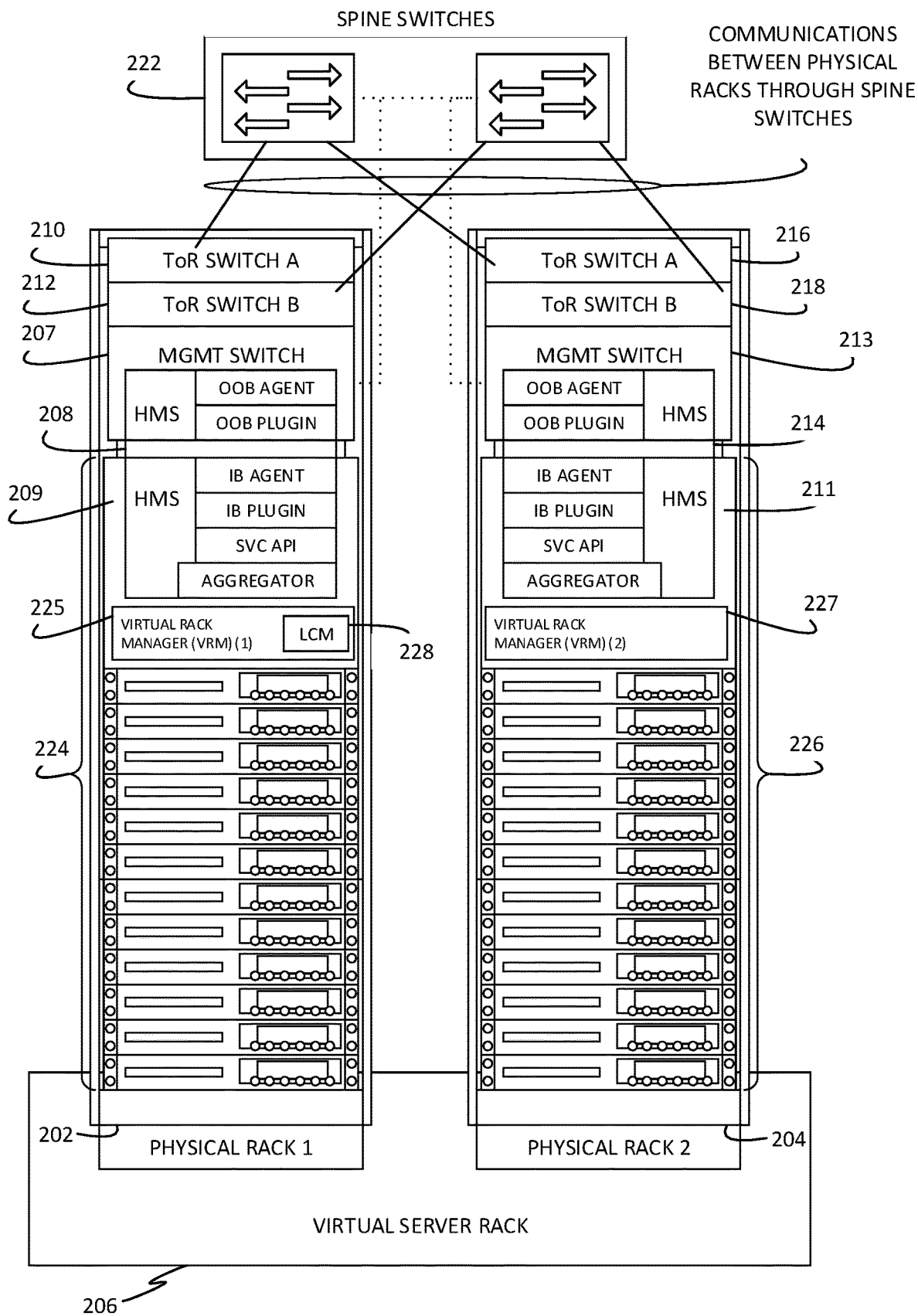
FIG. 2 depicts example physical racks in an example virtual server rack deployment.

FIG. 2 depicts example physical racks 202, 204 in an example deployment of a virtual server rack 206. For example, the physical racks 202, 204 may be ones of the physical rack 102 assembled by the example system integrator 104 of FIG. 1A. In the illustrated example, the first physical rack 202 has an example top-of-rack (ToR) switch A 210, an example ToR switch B 212, an example management switch 207, and an example server host node(0) 209. In the illustrated example, the management switch 207 and the server host node(0) 209 run a hardware management system (HMS) 208 for the first physical rack 202. The second physical rack 204 of the illustrated example is also provided with an example ToR switch A 216, an example ToR switch B 218, an example management switch 213, and an example server host node(0) 211. In the illustrated example, the management switch 213 and the server host node (0) 211 run an HMS 214 for the second physical rack 204.

In the illustrated example, the management switches 207, 213 of the corresponding physical racks 202, 204 run corresponding out-of-band (OOB) agents and OOB plugins of the corresponding HMSs 208, 214. Also in the illustrated example, the server host nodes(0) 209, 211 of the corresponding physical racks 202, 204 run corresponding IB agents, IB plugins, HMS service APIs, and aggregators.

In the illustrated example, the HMS 208, 214 connects to server management ports of the server host node(0) 209, 211 (e.g., using a baseboard management controller (BMC)), connects to ToR switch management ports (e.g., using 1 Gbps links) of the ToR switches 210, 212, 216, 218, and also connects to spine switch management ports of one or more spine switches 222. These example connections form a non-routable private Internet protocol (IP) management network for OOB management. The HMS 208, 214 of the illustrated example uses this OOB management interface to the server management ports of the server host node(0) 209, 211 for server hardware management. In addition, the HMS 208, 214 of the illustrated example uses this OOB management interface to the ToR switch management ports of the ToR switches 210, 212, 216, 218 and to the spine switch management ports of the one or more spine switches 222 for switch management. In examples disclosed herein, the ToR switches 210, 212, 216, 218 connect to server network interface card (NIC) ports (e.g., using 10 Gbps links) of server hosts in the physical racks 202, 204 for downlink communications and to the spine switch(es) (e.g., using 40 Gbps links) for uplink communications. In the illustrated example, the management switch 207, 213 is also connected to the ToR switches 210, 212, 216, 218 (e.g., using a 10 Gbps link) for internal communications between the management switch 207, 213 and the ToR switches 210, 212, 216, 218. Also in the illustrated example, the HMS 208, 214 is provided with IB connectivity to individual server nodes (e.g., server nodes in example physical hardware resources 224, 226) of the physical rack 202, 204. In the illustrated example, the IB connection interfaces to physical hardware resources 224, 226 via an operating system running on the server nodes using an OS-specific API such as vSphere API, command line interface (CLI), and/or interfaces such as Common Information Model from Distributed Management Task Force (DMTF).

The HMSs 208, 214 of the corresponding physical racks 202, 204 interface with virtual rack managers (VRMs) 225, 227 of the corresponding physical racks 202, 204 to instantiate and manage the virtual server rack 206 using physical hardware resources 224, 226 (e.g., processors, network interface cards, servers, switches, storage devices, peripherals, power supplies, etc.) of the physical racks 202, 204. In the illustrated example, the VRM 225 of the first physical rack 202 runs on three server host nodes of the first physical rack 202, one of which is the server host node(0) 209. As used herein, the term "host" refers to a functionally indivisible unit of the physical hardware resources 224, 226, such as a physical server that is configured or allocated, as a whole, to a virtual rack and/or workload; powered on or off in its entirety; or may otherwise be considered a complete functional unit. Also in the illustrated example, the VRM 227 of the second physical rack 204 runs on three server host nodes of the second physical rack 204, one of which is the server host node(0) 211. In the illustrated example, the VRMs 225, 227 of the corresponding physical racks 202, 204 communicate with each other through one or more spine switches 222. Also in the illustrated example, communications between physical hardware resources 224, 226 of the physical racks 202, 204 are exchanged between the ToR switches 210, 212, 216, 218 of the physical racks 202, 204 through the one or more spine switches 222. In the illustrated example, each of the ToR switches 210, 212, 216, 218 is connected to each of two spine switches 222. In other examples, fewer or more spine switches may be used. For example, additional spine switches may be added when physical racks are added to the virtual server rack 206.

In examples disclosed herein, a command line interface (CLI) and APIs are used to manage the ToR switches 210, 212, 216, 218. For example, the HMS 208, 214 uses CLI/APIs to populate switch objects corresponding to the ToR switches 210, 212, 216, 218. On HMS bootup, the HMS 208, 214 populates initial switch objects with statically available information. In addition, the HMS 208, 214 uses a periodic polling mechanism as part of an HMS switch management application thread to collect statistical and health data from the ToR switches 210, 212, 216, 218 (e.g., Link states, Packet Stats, Availability, etc.). There is also a configuration buffer as part of the switch object which stores the configuration information to be applied on the switch.

The example VRM 225, 227 of the illustrated example of FIG. 2 includes an example lifecycle manager (LCM) 228. The example LCM 228 is responsible for requesting software from the example virtual system solutions provider 110 and managing the installation of the example software. When a manifest file identifying information about a software bundle is received from the example virtual system solutions provider 110, the example LCM 228 determines if the manifest applies to the example physical rack 202, 204, verifies the presence of dependencies required for installation of the software components of the software bundle (or resolves such dependencies), ensures that there are sufficient computing resources for installation of the software components of the software bundle, schedules the software components for installation, and performs the installation of the software components.

Figure 4:
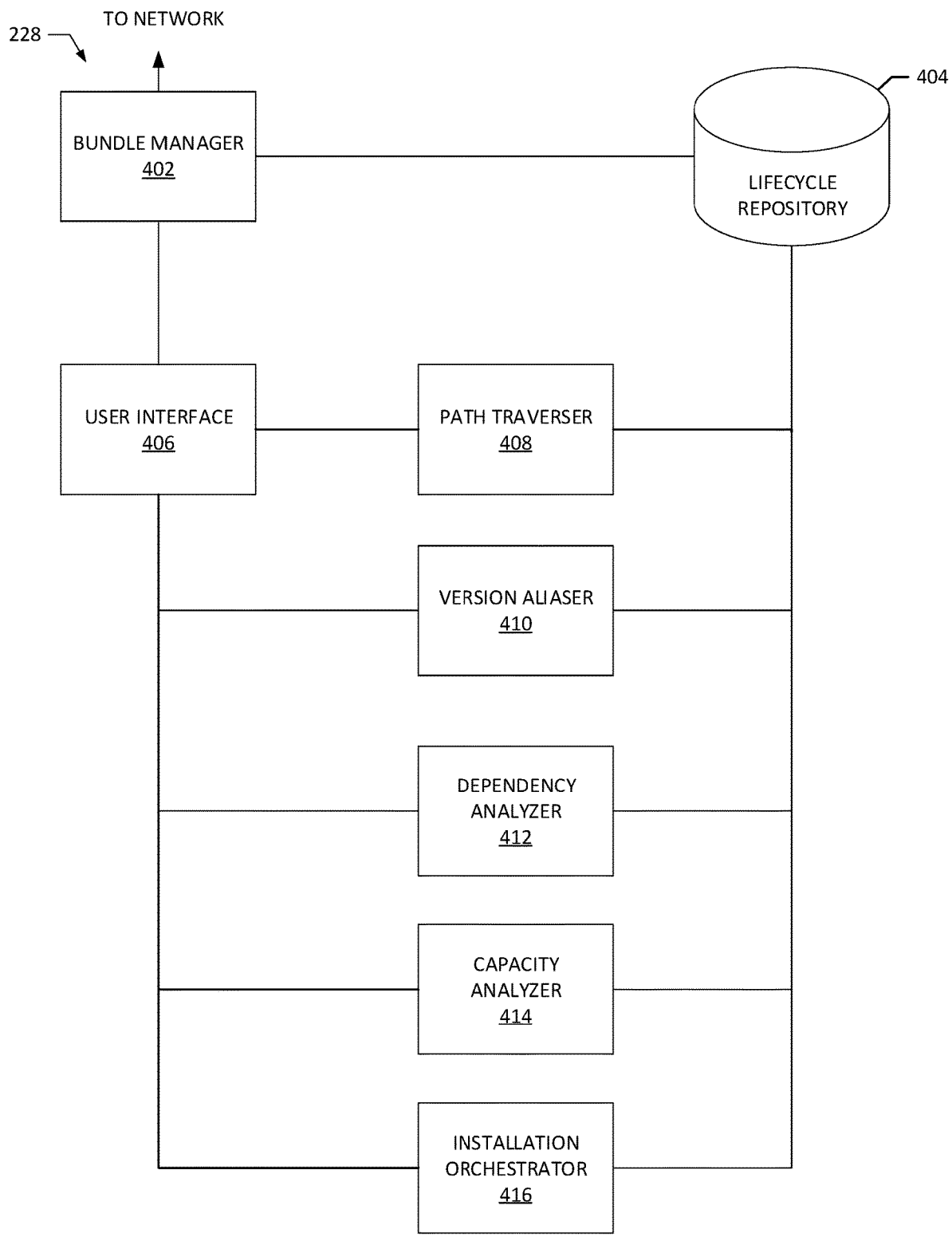
FIG. 4 is a block diagram of an example implementation of the example lifecycle manager of FIG. 2

An example implementation of the LCM 228 is illustrated in FIG. 4.

FIG. 3 is a block diagram of an example implementation of the software manager 114 of FIG. 1A and/or 1B. The example software manager 114 of FIG. 3 includes an example software receiver 302, an example bundle manager 304, an example bundle cumulator 306, an example repository interface 308, an example bundle overrider 310, an example alias handler 312, and an example request handler 314.

The example software receiver 302 of the illustrated example receives software components (e.g., drivers, firmware, operating systems, applications, etc.) from the example hardware/software suppliers 106 and transfers the software components to the example bundle manager 304. For example, the software receiver 302 may receive notifications from the example hardware/software supplier(s) 106 when new software is available and/or may periodically query the example hardware/software supplier(s) 106 for the availability of new software.

The example bundle manager 304 receives software from the example software receiver 302, coordinates testing of the software, and sends the received software to the bundle cumulator 306. When sending the software to the example bundle cumulator 306, the example bundle manager 304 adds a reference to the software to a manifest file that is associated with a software bundle (e.g., a collection of software for a particular physical rack version/implementation) to which the software is added. For example, the bundle manager 304 may add a new entry to the manifest file for the software and/or may replace a previous version of the software identified in the manifest file with the new version of the software. Testing of the software may be accomplished by an administrator installing the software on a test physical rack and verifying that the software installs as expected and does not interfere with the operation of the test physical rack (e.g., does not cause errors, does not conflict with our software or hardware, etc.). During the testing of the software, the example bundle manager 304 collects dependency information (e.g., information about what software components may be required for installation of the software). The example bundle manager 304 stores the dependency information in a manifest file associated with the software bundle to which the software is added. For example, the example bundle manager 304 may receive user input identifying software dependencies, may receive an input file identifying software dependencies, may monitor the software installation to programmatically determine software dependencies, etc.

The example bundle cumulator 306 receives tested software bundle from the example bundle manager 304, cumulates the received software bundle, flags the software bundle as cumulative, and adds the new software to the example repository interface 308. When cumulating the software bundle received from the example bundle manager 304, the software bundle is further tested to determine if it can be flagged as cumulative. For example, the example bundle cumulator 306 will test the software bundle against software bundles associated with a previous version. In some examples, the testing determines if the software bundle includes software from previous versions that would allow it to upgrade an SDDC infrastructure component from previous versions to the version associated with the software bundle received from the example bundle manager 304.

In some example, an administrator tests the software by installing it on a test physical rack and verifying that the software installs as expected and does not interfere with the operation of the test physical rack (e.g., does not cause errors, does not conflict with our software or hardware, etc.). After testing, the example bundle cumulator 306 flags the software bundle as cumulative. For example, when the example bundle cumulator 306 flags the software bundle as cumulative, it is adding a reference (e.g., a flag or mark) to the software to a manifest file that is associated with the software bundle. The example bundle cumulator 306 will then add the software bundle to the example repository interface 308.

The example repository interface 308 interfaces with the example repository 116. For example, the repository interface 308 may be a database interface of the example software manager 114. Alternatively, the repository interface 308 may be any other type of interface to facilitate the example bundle cumulator 306, the example bundle overrider 310, the example alias handler 312, and/or the example request handler 314 storing and/or retrieved manifest files and/or software from the example repository 116.

The example bundle overrider 310 receives information pertaining to previously stored software bundles from the example physical rack 102 at the example customer premise 118 of FIG. 1B. For example, the bundle overrider 310 may receive a whitelist (e.g., a static comma separated list) of released bundles not marked as cumulative. The example whitelist contained in the example bundle overrider 310 allows the example lifecycle manager 228 of FIG. 2 to identify released software bundles that can act as a cumulative software bundle, even though they are not flagged as cumulative. The example bundle overrider 310 stores the example whitelist in the example repository 116 via the example repository interface 308.

The example alias handler 312 receives information pertaining to intermediate versions (e.g., alias version) from the example physical rack 102 at the example customer premise 118 of FIG. 1B. As used hereinafter, the term intermediate version will be referred to as alias version. As used herein, alias version refers to a version that an SDDC infrastructure component in running at that is not supported by the example lifecycle manager 228 of FIG. 2. For example, the example lifecycle manager 228 supports a version 1, a version 2, a version 3, a version 4, etc. As used hereinafter, these versions can be referred to as base versions. In some examples, the lifecycle manager 228 supports the base versions. For example, the base versions are supported if they have been previously tested and deployed by the example physical rack 102 at the example customer premise 118 of FIG. 1B. An alias version not supported by the example lifecycle manager 228 may, for example, be a version 1.1, a version 2.2, a version 3.3, a version 4.4, etc. These alias versions are not supported by the example lifecycle manager 228 because they were not tested and deployed by the example physical rack 102 at the example customer premise 118 of FIG. 1B. For example, the alias versions may be a "hot patch" (e.g., a set of changes to a system to improve, update, or fix the system while the system is running) that was released for a high priority security or functionality issue of an SDDC infrastructure component.

The example alias handler 312 receives information including data that adds multiple alias versions for the same base version of an SDDC infrastructure component. For example, the example alias handler 312 may add alias version 1.1 and alias version 1.2 as base version 1. The example alias handler 312 also adds multiple base versions for a SDDC infrastructure component. For example, the example alias handler 312 may add alias version 1.2 as base version 1 and alias version 2.2 as base version 2. The alias handler 312 stores the received information pertaining to an alias version in the example repository 116 via the example repository interface 308.

The example request handler 314 receives requests for software images and/or updated software bundles from the example virtual imaging appliance 112 of FIG. 1A and/or the example physical rack 102 at the example customer premise 118 of FIG. 1B. In response to the requests, the example request handler 314 retrieves the requested information. For example, the request handler 314 may retrieve a manifest file and transmit the manifest file to the source of the request (e.g., the example virtual imaging appliance 112 and/or the example physical rack 102) to allow the source of the request to determine if the manifest file identifies software associated with the physical rack 102 on which the software is to be installed. For example, the manifest file may identify a SKU that is checked against a SKU associated with the physical rack 102. The example request handler 314 may retrieve the software (e.g., a software image, software bundle, etc.) from the example repository 116 and transmit the software to the source of the request when the source of the request indicates that the manifest file identifies the desired software.

While an example manner of implementing the software manager 114 of FIGS. 1A and/or 1B is illustrated in FIG. 3, one or more of the elements, processes and/or devices illustrated in FIG. 3 may be combined, divided, re-arranged, omitted, eliminated and/or implemented in any other way. Further, the example software receiver 302, the example bundle manager 304, the example bundle cumulator 306, the example repository interface 308, the example bunder overrider 310, the example alias handler 312, and, the example request handler 314 and/or, more generally, the example software manager 114 of FIG. 3 may be implemented by hardware, software, firmware and/or any combination of hardware, software and/or firmware. Thus, for example, any of the example software receiver 302, the example bundle manager 304, the example repository interface 306, the example request handler 308 and/or, more generally, the example software manager 114 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one the example software receiver 302, the example bundle manager 304, the example bundle cumulator 306, the example repository interface 308, the example bunder overrider 310, the example alias handler 312, and, the example request handler 314 and/or, more generally, the example software manager 114 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example software manager 114 of FIGS. 1A and/or 1B may include one or more elements, processes and/or devices in addition to, or instead of, those illustrated in FIG. 3, and/or may include more than one of any or all of the illustrated elements, processes and devices.

FIG. 4 is a block diagram of example implementation of the LCM 228 in the example VRM 225 of the example physical rack 202 of FIG. 2 (e.g., the physical rack 102 deployed at the example customer premise 118). The example LCM 228 includes an example bundle manager 402, an example lifecycle repository 404, an example user interface 406, an example path traverser 408, an example version aliaser 410, an example dependency analyzer 412, an example capacity analyzer 414, and an example installation orchestrator 416.

The example bundle manager 402 interfaces with the example software manager 114 of the example virtual system solutions provider 110 of FIG. 1B to receive manifest files and software to be deployed at the example physical rack 202 and/or other ones of the physical rack 202 deployed in a cluster). The example bundle manager 402 periodically polls the example software manager 114 to determine if there is an updated manifest file to be analyzed for applicability to the example physical rack 202. Alternatively, the bundle manager 402 may receive notifications when a new manifest file is available (e.g., if the bundle manager 402 has registered with the virtual system solutions provider 110 to receive such notifications). When a new manifest is received by the bundle manager 402 the bundle manager 402 determines if the manifest is applicable to the physical rack and, if so, the example bundle manager 402 notifies the example user interface 406 that a new manifest has been received. If the example user interface 406 notifies the bundle manager 402 that an administrator has requested a presentation of cumulative software bundles available for an upgrade, the example bundle manager 402 simulates the example path traverser 408 to determine what software bundles are available for a cumulative upgrade. If the example path traverser 408 has determined the cumulative software bundles available for upgrade, it may notify the example user interface 406 to present the cumulative software bundles to the administrator. The example user interface 406 notifies the bundle manager 402 that an administrator has approved/scheduled a download of the cumulative software bundle and the example bundle manager 402 retrieves the software identified by the example manifest file and stores the software in the example lifecycle repository 404 along with the manifest file.

The lifecycle repository 404 of the illustrated example stores manifest files and software received from the example virtual systems solution provider 110 via the example bundle manager 402. The example lifecycle repository 404 is a software database. Alternatively, the lifecycle repository 404 may be implemented by any type of file and/or data storage such as, for example, a network attached storage, a hard drive, a shared network drive, a file, a folder, etc.

The example user interface 406 of FIG. 4 provides notifications to administrators of the physical rack 202 and receives instructions from the administrators. For example, when the example bundle manager 402 notifies the example user interface 406 that a new manifest/software bundle has been received, the example user interface 406 presents a notification to the administrator and requests the administrator's input as to whether the administrators would like to receive a list of possible cumulative software bundles available to download or download the software bundle and/or schedule installation of the software bundle. When the example user interface 406 receives an instruction from an administrator to retrieve software bundles available for upgrade and present a list, the example user interface 406 notifies the example path traverser 408. When the example user interface 406 receives an instruction from an administrator to download software bundle, the example user interface 406 notifies the example bundle manager 406. When the example user interface 406 receives an instruction from an administrator to schedule installation of the software bundle, the example user interface 406 notifies the example version aliaser 410, the example dependency analyzer 412, the example capacity analyzer 414, and/or the example installation orchestrator 416. The example user interface 406 additionally presents any error notifications generated by the example dependency analyzer 412, the example capacity analyzer 410, and/or the example installation orchestrator 416.

Figure 5:
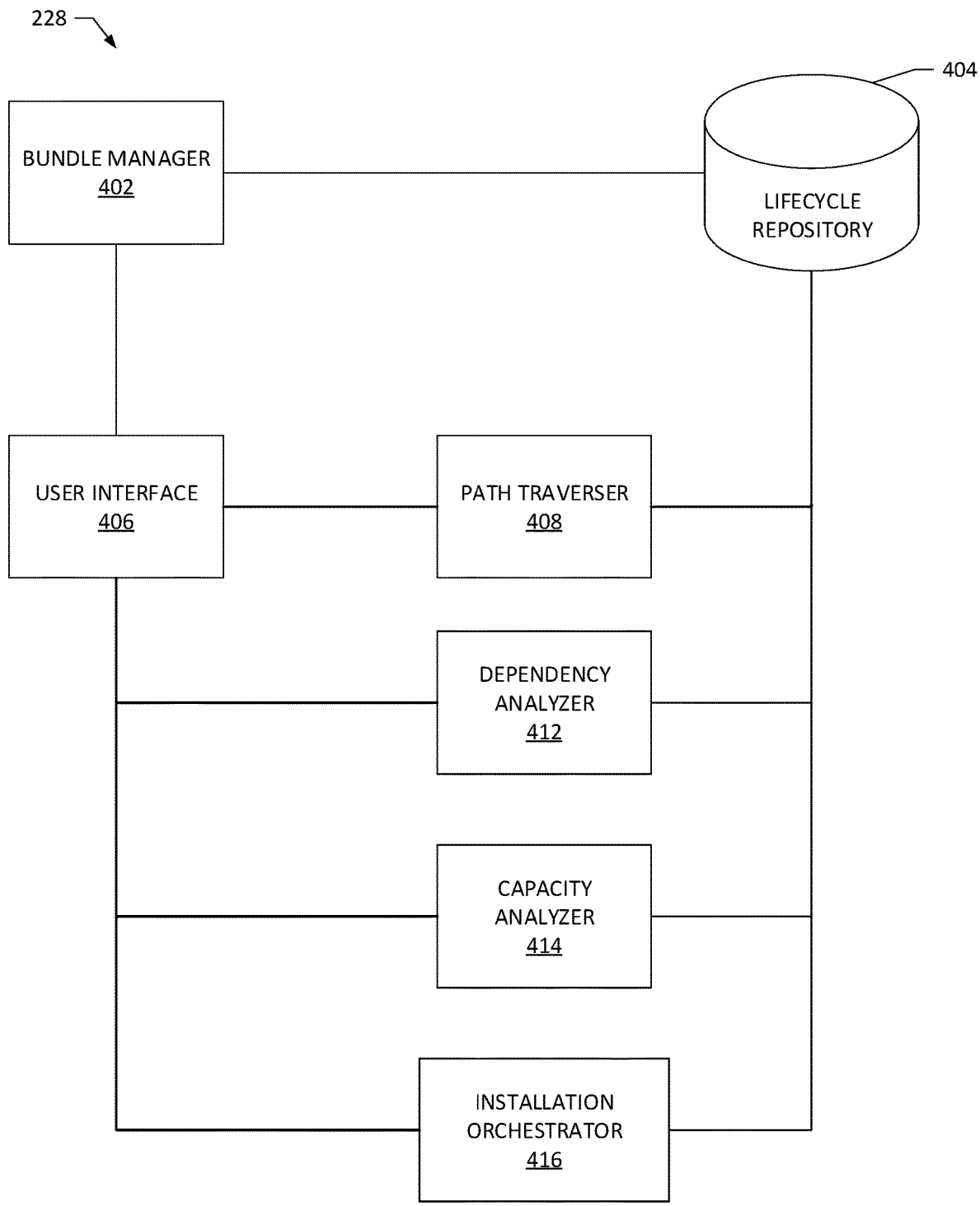
FIG. 5 is a block diagram of an example implementation of the example lifecycle manager of FIG. 2 excluding the example version aliaser 410.

The example path traverser 408 of FIG. 4 and FIG. 5 receives a notification from the example user interface 406. For example, an example user interface 406 may receive a request from an administrator to retrieve all software bundles flagged as cumulative. The administrator may request this information because the example physical rack 102 deployed at an example customer premise 118 of FIG. 1B may have SDDC infrastructure components that have missed multiple version upgrades. The software bundles flagged as cumulative may contain software that may expedite the downloading and/or scheduling of multiple software bundles that take the SDDC infrastructure component to its most recent version. For example, an SDDC infrastructure component may be running at version 1. The example lifecycle manager 228 may have received software bundles that may upgrade the SDDC infrastructure component to a version 2, a version 3, and a version 4. A software bundle flagged as cumulative or on the whitelist may present an administrator the option to skip upgrading the component to a version 2, then to a version 3, then to a version 4, and instead upgrade directly from version 1 to version 4.

The example path traverser 408 traverses a path from a source version that an SDDC infrastructure component is running at to a target version in an example Directed Acyclic Graph (i.e., DAG) 500 of FIGS. 4A and 4B. A Directed Acyclic Graph (DAG) is a graph used in computer science, mathematics, and/or etc., in which there are a series of vertices connected by edges. In a directed graph, the edges are connected so that each edge only goes one way. The example DAG 500 is a graph to model the relationship between the example versions 502, 506, 510, 514 (vertices) and the example bundles 504, 508, 512 (edges). The example DAG 500 is built using bundle manifest files. For example, the example bundle 1 504 is a manifest file associated with a software bundle that contains software in which would upgrade an SDDC infrastructure component from example version 1 502 to example version 2 506. The example path traverser 408 locates a source version (i.e., vertex) (e.g., the current version that an SDDC infrastructure component is running at) that is modeled in the example DAG 500 and traverses a path along the vertices (i.e., versions) and edges (i.e., bundle manifest files) until an edge (i.e., bundle manifest file) associated with a non-cumulative bundle is found. For example, an example user interface 406 may receive a request from an administrator to retrieve all software bundles flagged as cumulative for an SDDC infrastructure component. The example user interface 406 may notify the example path traverser 408 to simulate a traversal along an example DAG 500. The example path traverser 408 may retrieve information from the example lifecycle repository 404 to determine the source version the SDDC infrastructure component may be running at. The lifecycle repository 404 may identify that the SDDC infrastructure component is running at example version 1 502 and notify the example path traverser 408. The example path traverser 408 may traverse an outgoing path beginning at example version 1 502 and may continue visiting the next version until a bundle manifest file (i.e., edge) associated with a non-cumulative bundle is found. For example, the example path traverser 408 may traverse an outgoing path from an example version 1 502 to an example version 4 514. During the traversal, the path may identify that an example bundle 1 504, associated with a bundle manifest file, may not be flagged as cumulative. The path may also identify that an example bundle 2 508, associated with a bundle manifest file, may be flagged as cumulative. The path may finally identify that an example bundle 3 512, associated with a bundle manifest file, may not be flagged as cumulative. The example path traverser 408 may notify the example user interface 406 that the administrator may directly apply example bundle 2 508 on top of the source version, example version 1 502, to upgrade the source version, example version 1 502, to an example version 3 510. The example path traverser 408 may also notify the example user interface 406 that the administrator may apply an example bundle 3 512 on top of example version 3 510, to upgrade the example version 3 510 to example version 4 514.

The example version aliaser 410 of FIG. 4 may receive a notification from the example user interface 406 and/or from the example path traverser 408 that the administrator has requested to schedule a download of a software bundle and/or has requested to receive software bundles available for version upgrade of an SDDC infrastructure component. The example version aliaser 410 may check if the SDDC infrastructure component is running at an alias version (e.g., a version not identified and/or supported by the lifecycle manager 228). The example version aliaser 410 may determine that the SDDC infrastructure component is running at an alias version and may then poll the example lifecycle repository 404 for data pertaining to the alias version. For example, the example version aliaser 410 may determine an SDDC infrastructure component is running at an example version 1.1 508 of FIG. 4B (i.e., alias version). The example DAG 600 of FIG. 4B is similar to the example DAG 500 of FIG. 4A in that it may be built using bundle manifest files and it may model the relationship between the versions and the bundles, where the example versions 502 and 506 are the vertices and the example bundle 1 504 is the edge connecting the vertices. The example DAG 600 includes an example version 1.1 508 in which represents an alias version.

After the example version aliaser 410 of FIG. 4 determines an SDDC infrastructure component is running at an example version 1.1 508, it retrieves information from the example lifecycle repository 404 to convert the example alias version 1.1 508 to a base version (i.e., a version supported by the lifecycle manager 228). For example, the example lifecycle repository 404 may contain data and/or information from the example alias handler 312 of FIG. 3 that may determine a base version for an alias version. The data and/or information that determines a base version for an alias version may be stored as a look-up table, a list, or any other form of data organization method. For example, the example version aliaser 410 may determine that example alias version 1.1 508 is equivalent to example base version 1 502. The example version aliaser 410 may flag the example alias version 1.1 508 as equivalent to example base version 1 502, thus "converting" example alias version 1.1 508 to example base version 502.

The dependency analyzer 412 of the illustrated example receives a notification from the example user interface 406 that an administrator has requested installation of a software bundle. In response to the notification, the example dependency analyzer 412 determines the dependency requirements of the software bundle by analyzing the manifest files, checks the dependency requirements against the current state of the hardware and software components installed on the physical rack 202, and notifies the installation orchestrator 416 of an order of software installation desired and/or required by the dependency requirements of the software bundle. For example, the dependency analyzer 412 may determine that version 3.0 of an SDDC infrastructure component requires that version 2.0 be currently installed and, after determining that version 1.0 is currently installed, will add version 2.0 to the installation schedule. In another example, a manifest file may indicate that a web server update requires a database update that is also identified in the manifest file. The example dependency analyzer 412 will, in such an instance, notify the example installation orchestrator 416 that the database update, in this example, should be scheduled prior to the web server update.

The capacity analyzer 414 of the illustrated example receives a notification from the example user interface 406 that an administrator has requested installation of a software bundle. In response to the notification, the example capacity analyzer 414 retrieves the manifest file for the software bundle from the example lifecycle repository 404. The example capacity analyzer 414 determines the hardware and/or software computing resources of the example physical rack 202 (and other physical racks 202 that may be clustered) that will be affected by the installation of the software bundle. For example, the capacity analyzer 414 determines which hardware and/or software components will need to be restarted in order to perform the installation of the software bundle. The capacity analyzer 414 compares the computing resource impact to the available computing resources of the example physical rack 202 (and cluster of physical racks 202) and the operating requirements of the example physical rack 202 (e.g., service level agreements indicating the required computing resource availability and/or redundancy). The example capacity analyzer 414 determines if there are sufficient computing resources to perform the software installation without interfering with the operating requirements. The example capacity analyzer 414 determines the available computing resources by determining the affected computing resources (e.g., determining a workload domain that has been scheduled for an update) and queries an application program interface (API) associated with an operating environment (e.g., queries a VMware vCenter® server). For example, the capacity analyzer 414 may determine that there are two ToR switches 210, 212 installed in the example physical rack 202 and, accordingly, when the software installation requires a switch reboot to update the switch, one of the ToR switches 210, 212 can be rebooted at a time without affecting performance of the physical rack 202. Alternatively, the capacity analyzer 414 may determine that all processing resources allocated to a particular workload domain (or any other type of computing resource cluster) are in use (e.g., a workload is currently executing on all computing resources such that no computing resources can be temporarily deactivated for updating). In such an instance, the example capacity analyzer 414 will allocate (or attempt to allocate) an additional computing resource(s) (e.g., add another server to the workload domain) so that the executing workload can be temporarily migrated from the computing resources in the workload domain (e.g., one at a time) onto the additional computing resource(s) while the computing resources are updated. For example, after the workload is migrated from one of the computing resources, the computing resource may be moved to a maintenance mode, updated, rebooted, and returned to operating mode. Thus, in addition to analyzing the capacity for installation of the software bundle, the example capacity analyzer 414 facilitates the addition of capacity when needed. The capacity analyzer 414 communicates information about the capacity arrangements to the example installation orchestrator 416 for use when scheduling the installation (e.g., to notify the installation orchestrator 416 of the availability of the additional computing resources that may be utilized during the installation).

The example installation orchestrator 416 receives information collected by the example path traverser 408, the example version aliaser 410, the example dependency analyzer 412 and the example capacity analyzer 414 and schedules the installation of the software of the software bundle identified in the received manifest. The example installation orchestrator 416 schedules (or attempts to schedule) the installation of the software to meet the dependency requirements and to avoid interruption of the operation of the physical rack 202 (and/or multiple physical racks 202). According to the illustrated example, the installation orchestrator 416 schedules devices for independent unavailability (e.g., schedules unavailability of redundant devices so that at least one of the redundant devices is available at all times). Furthermore, the example installation orchestrator 416 schedules the temporary movement/migration of virtual machines during the installation.

Figure 8:
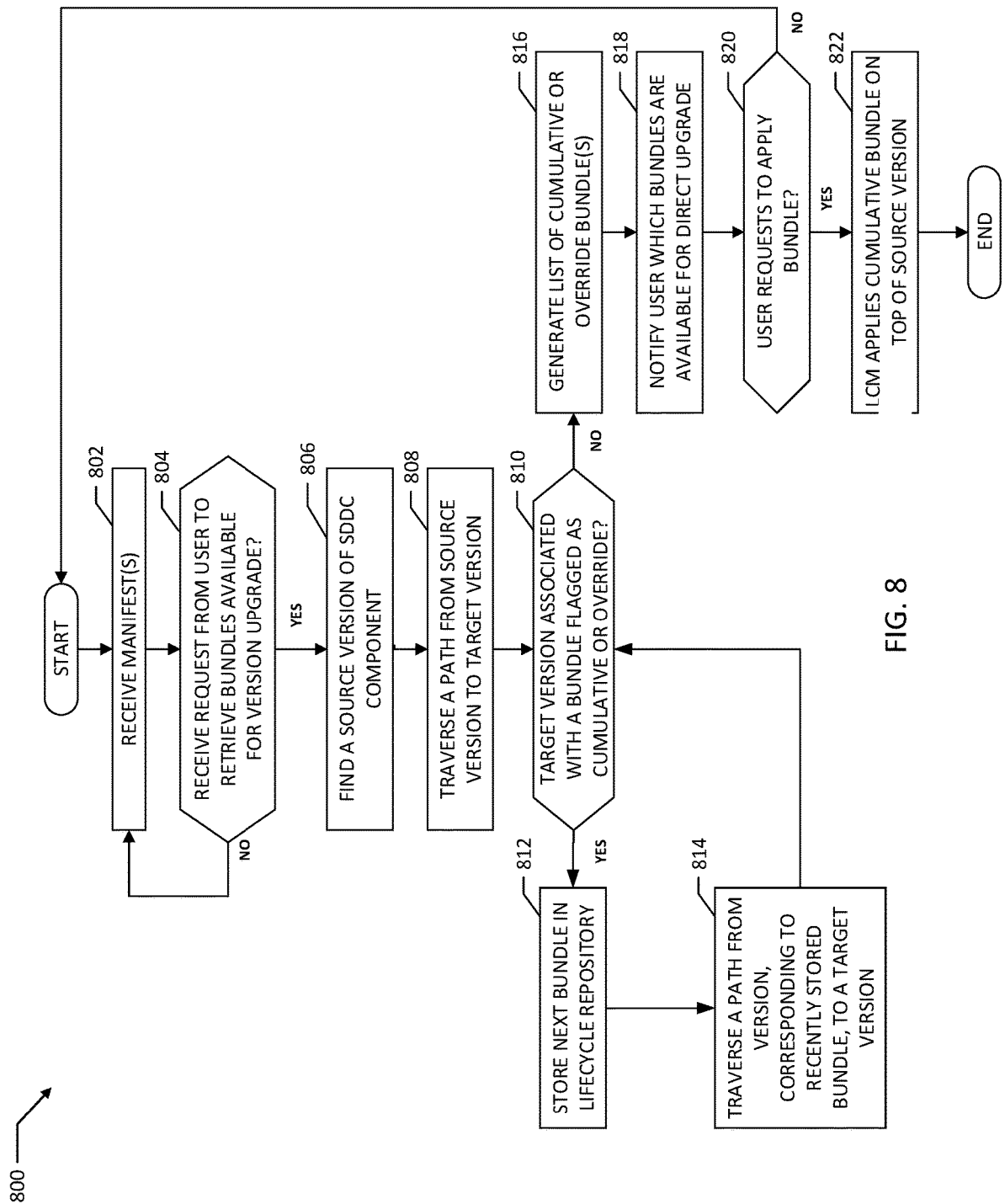
FIGS. 8, 9, 10A, and 10B are flowcharts representative of machine readable instructions that may be executed to implement the example lifecycle manager of FIGS. 2, 4, 5, and/or 6.
Figure 9:
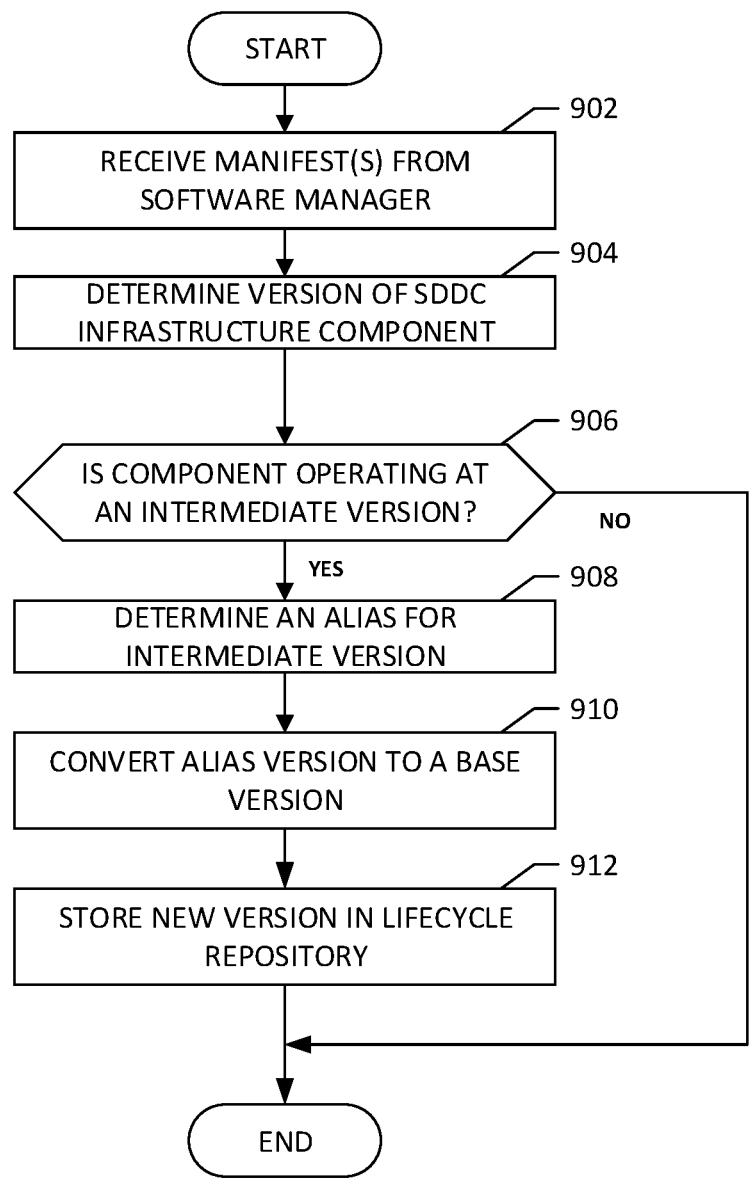

Flowcharts illustrating example instructions for implementing the example LCM 228 of FIGS. 2, 4, 5 and/or 6 are described in conjunction with FIGS. 8-10.

Figure 6:
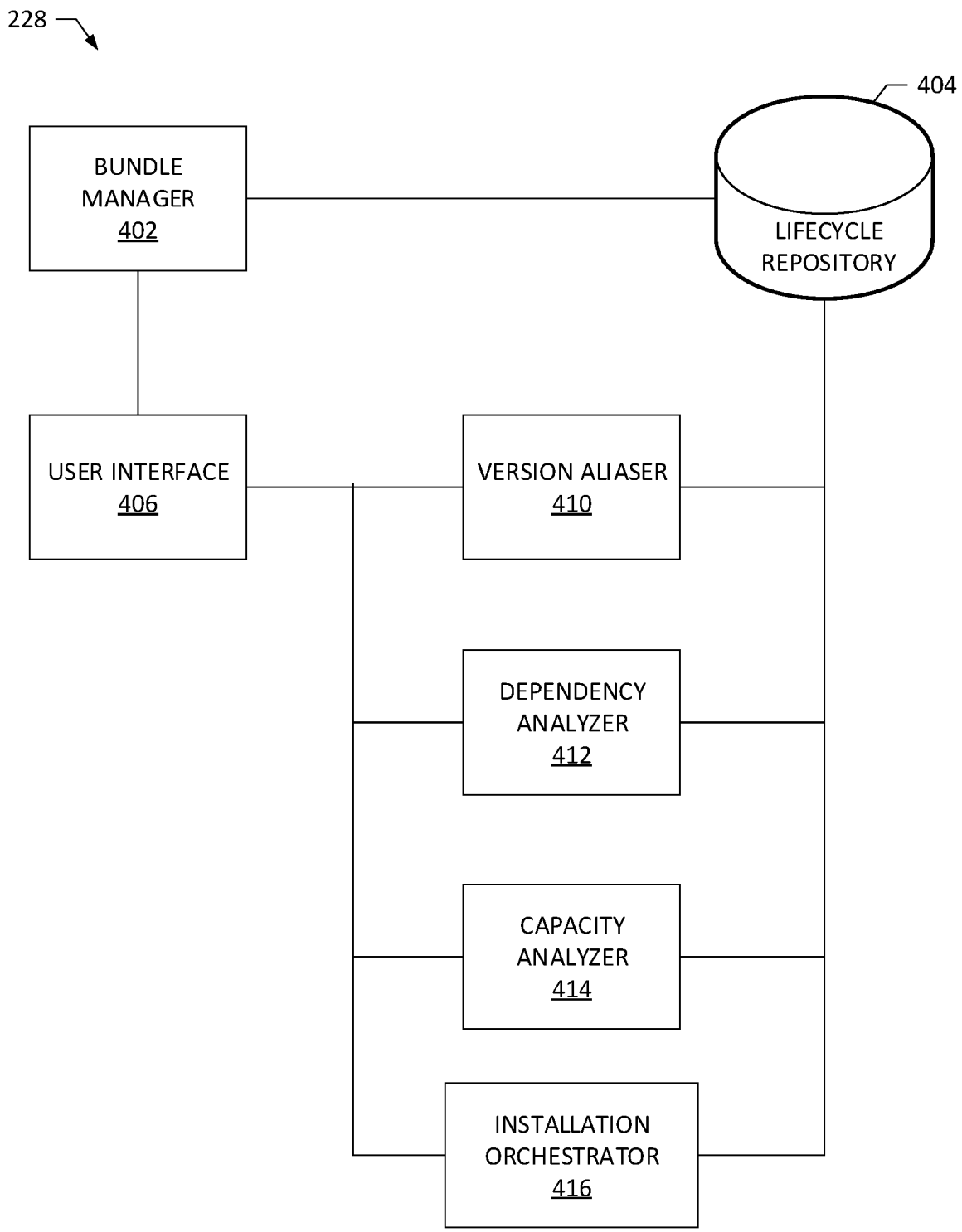
FIG. 6 is a block diagram of an example implementation of the example lifecycle manager of FIG. 2 excluding the example path traverser block 408.

While an example manner of implementing the lifecycle manager 228 of FIG. 2 is illustrated in FIG. 4, one or more of the elements, processes and/or devices illustrated in FIG. 4 may be combined, divided, re-arranged, omitted, eliminated and/or implemented in any other way. For example, FIGS. 5 and 6 also illustrate the example lifecycle manager 228 implemented in FIG. 2. Further, the example bundle manager 402, the example lifecycle repository 404, the example user interface 406, the example path traverser 408, the example version aliaser 410, the example dependency analyzer 412, the example capacity analyzer 414, the example installation orchestrator 416, and/or, more generally, the example lifecycle manager 228 of FIG. 2 may be implemented by hardware, software, firmware and/or any combination of hardware, software and/or firmware. Thus, for example, any of the example bundle manager 402, the example lifecycle repository 404, the example user interface 406, the example path traverser 408, the example version aliaser 410, the example dependency analyzer 412, the example capacity analyzer 414, the example installation orchestrator 416 and/or, more generally, the example lifecycle manager 228 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, bundle manager 402, the example lifecycle repository 404, the example user interface 406, the example path traverser 408, the example version aliaser 410, the example dependency analyzer 412, the example capacity analyzer 414, and/or the example installation orchestrator 416 is/are hereby expressly defined to include a non-transitory computer readable storage device or storage disk such as a memory, a digital versatile disk (DVD), a compact disk (CD), a Blu-ray disk, etc. including the software and/or firmware. Further still, the example lifecycle manager 228 of FIG. 2 may include one or more elements, processes and/or devices in addition to, or instead of, those illustrated in FIG. 4, and/or may include more than one of any or all of the illustrated elements, processes and devices.

Figure 7:
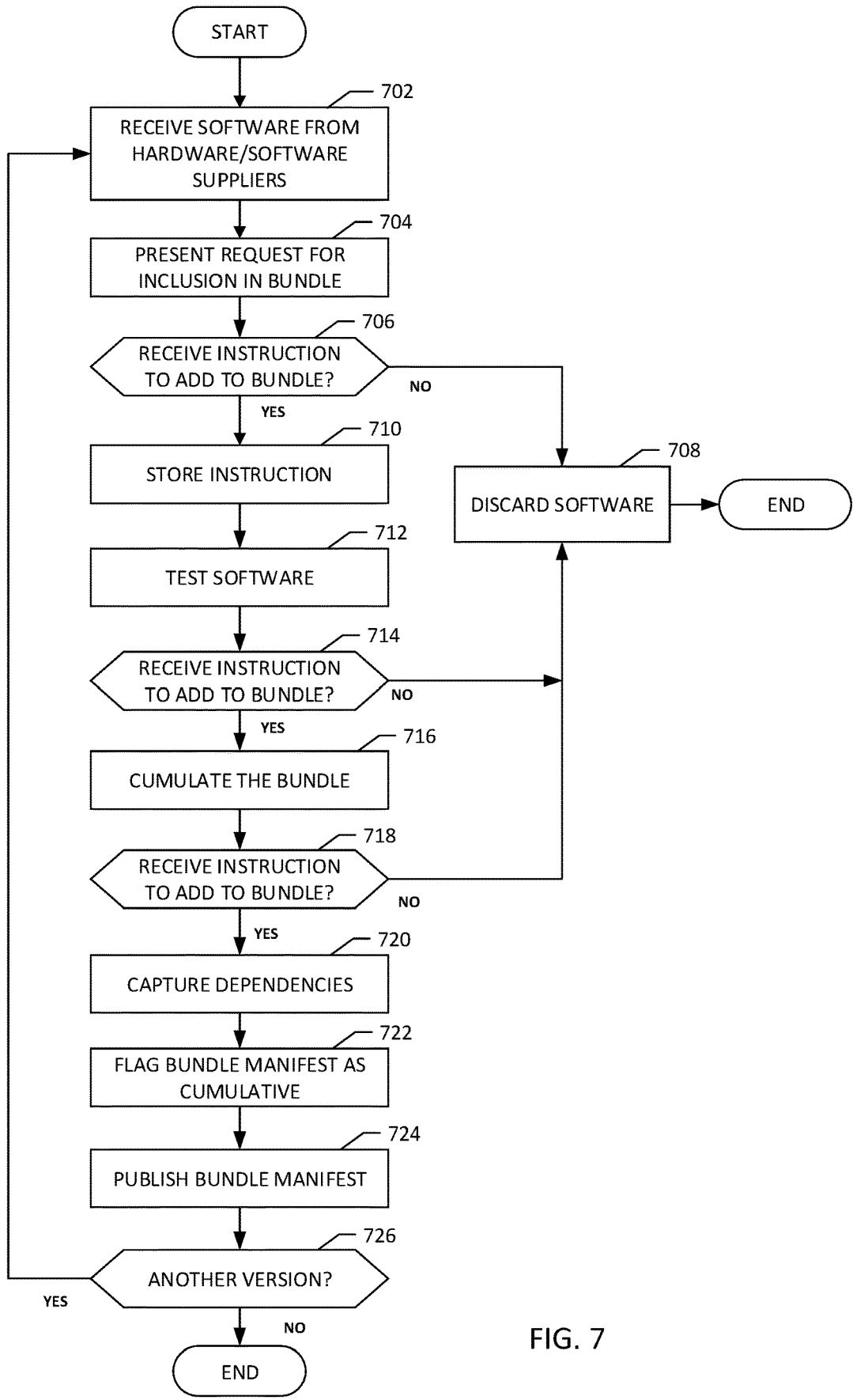
FIG. 7 is a flowchart representative of example machine readable instructions that may be executed to implement the example software manager of FIGS. 1A, 1B, and/or 3.

A flowchart representative of example machine readable instructions for implementing the example software manager 114 of FIGS. 1A, 1B and/or 3 is shown in FIG. 7. The machine readable instructions may be an executable program or portion of an executable program for execution by a computer processor such as the processor 1112 shown in the example processor platform 1100 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 7, many other methods of implementing the example software manager 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The program of FIG. 7 begins when the example software receiver 302 of the example software manager 114 receives software from a hardware/software supplier (block 702). For example, the software may include applications, drivers, operating systems, configuration files, etc. The software may be received in a notification from the hardware/software supplier, may be received in response to a polling of the software supplier by the example software receiver 302, etc.

The example software receiver 302 then presents a request to include the new software in an appropriate bundle (block 704). For example, the software receiver 302 may add an item to a task list requesting approval to add the software to the bundle, may present a notification on a graphical user interface, etc. The example software receiver 302 determines if an instruction to add the software to the bundle has been received (block 706). When an instruction to not add the software to the bundle has been received, the example software receiver 302 discards the received software (block 708).

When an instruction to add the software to the bundle has been received (block 706), the example bundle manager 304 stores the software for the bundle (e.g., stores the software in the example repository 116) (block 710). The example bundle manager then tests the software (block 712). For example, an administrator may install the software on the example physical rack 102 and/or in the example virtual server rack 206 to verify that the software operates as intended, does not interfere with other operations, etc. The example bundle manager 304 then determines if an instruction to continue adding the software to the bundle has been received following the testing (block 714). When an instruction to not add the software to the bundle has been received (e.g., because the testing of the software identified problems), the example bundle manager 304 discards the software (block 708).

The example bundle cumulator 306 may then cumulate the bundle (block 716). For example, the bundle cumulator 306 may retrieve software associated with previous bundles, that have updates for an SDDC infrastructure component from, the repository 116 via the repository interface 308 and may add and/or "cumulate" (block 716) the retrieved software with the newly downloaded software.

When the example bundle manager 304 receives an instruction to continue adding the software to the bundle (block 718), the example bundle manager 304 captures dependencies of the example software (block 720). The dependencies may be captured by tracing the testing of the software to track dependencies accessed during the testing, by receiving a dependency record (e.g., a file) identifying required dependencies for the software, by receiving user input identifying dependencies, etc. According to the illustrated example, the dependencies are captured by recording the dependencies in a manifest file to be distributed with a bundle including the software. Alternatively, the dependencies may be captured in any other manner (e.g., stored in a database that is accessed to build a manifest).

When the dependencies are captured and recorded in a manifest file, the example bundle cumulator 306 may flag the manifest file as cumulative (block 722). The example repository interface 308 publishes the manifest file that is generated with the dependency information and flagged as cumulative (block 724). According to the illustrated example, the repository interface 308 stores the manifest (e.g., and the software identified in the manifest) in the example repository 116 of FIG. 1 to enable the request handler 314 to service requests. For example, the manifest may be identified as the most current cumulative manifest (e.g., replacing multiple previous manifests) such that the software requests received by the example request handler 314 are serviced by transmitting the most-current cumulative manifest and/or software.

According to the illustrated example, when the software bundle associated with a virtual server rack is updated, the example request handler 314 updates a virtual server rack image utilized by the example virtual imaging appliance 112 of FIG. 1 to ensure that the virtual imagining appliance 112 will utilized the latest software when deploying a virtual server rack (block 726).

Flowcharts representative of example machine readable instructions for implementing the example lifecycle manager 228 of FIGS. 2, 4, 5, and/or 6 are shown in FIGS. 8-10. In these examples, the machine readable instructions comprise a program(s) for execution by a processor such as the processor 1212 shown in the example processor platform 1200 discussed below in connection with FIGS. 8-10. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 8-10, many other methods of implementing the example lifecycle manager 228 may alternatively be used. For example, the order of execution of the blocks may be changed, and/or some of the blocks described may be changed, eliminated, or combined.

As mentioned above, the example process of FIGS. 8-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIGS. 8-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

The process of FIG. 8 begins when the example bundle manager 402 receives a is new manifest (block 802). The example bundle manager 402 may receive a bundle in request to transmitting a request for a new bundle to the example request handler 314 of the example software manager 114, may receive a manifest from a notification transmitted by the example request handler 314 to the example bundle manager 402, etc.

The example bundle manager 402 may notify the example user interface 406 that a new manifest has been received and prompt the user with an option to retrieve bundles available for a cumulative version upgrade. For example, the example user interface 406 may notify the user that an SDDC infrastructure component has a new software update but may present the user an option to look for possible cumulative upgrades in the case the user has skipped previous upgrades for that infrastructure component. The example user interface 406 will then notify the example bundle manager 402 if a request was received from the user to retrieve bundles available for cumulative upgrade (block 804). The example bundle manager 402 may look for another received manifest that is new if the example bundle manager 402 has not received a request from a user to retrieve bundles available for cumulative version upgrade. Accordingly, the example bundle manager 402 may discard the received software, determine if manifest revokes a prior manifest, ask user to schedule a download of the software without a cumulative upgrade, etc.

When the example bundle manager 402 receives a request from the user to retrieve bundles available for version upgrade (block 804), the example bundle manager 402 may find a source version of the SDDC infrastructure component that the new manifest file corresponds to (block 806). The example bundle manager 402 may find the source version (current version the component is running at) by analyzing information stored in the lifecycle repository 404 (e.g., analyzing a version number of the most recently installed version, identifying a manifest file corresponding to a most recently installed version, etc.).

When the example bundle manager 402 determines the source version of the SDDC component (block 806), the information is stored in the lifecycle repository and the path traverser 408 is notified. The example path traverser 408 will traverse a path (e.g., scan, examine, check, etc., the bundle manifests associated with the component in an order) from the identified source version to a target version (block 808). The target version may be the next version in the example Directed Acyclic Graph of FIG. 4A (e.g., if the source version was version 1 502 then the target version is version 2 506).

The example path traverser 408 may determine if the target version reached by the path contains a bundle flagged as cumulative or in the whitelist (block 810). For example, the example path traverser 408 may analyze the bundle manifest file associated with the target version and check if it was published and/or stored in the bundle overrider 310 of FIG. 3 as a cumulative bundle. If the bundle manifest file corresponding to the target version was flagged as cumulative or in the whitelist, it is stored in the lifecycle repository 404 (block 812). The example path traverser 408 continues to traverse a path from the stored bundle manifest file corresponding to a target version to a next target version (block 814) (e.g., if the stored target version is version 2 506 of FIG. 4A, then the next target version along the path would be version 3 510).

The example path traverser 408 continues to analyze and/or determine if the new target version has a bundle manifest file flagged as cumulative or on the whitelist stored in the example bundle overrider 310 (block 810). This process continues until a bundle manifest file is not flagged as cumulative or on the whitelist.

When a bundle manifest file is not cumulative, the example bundle manager 402 will retrieve all bundle manifest files that were stored in the lifecycle repository 404 during the above processes (e.g., the example bundle manager may analyze information in the lifecycle repository 404 pertaining to flags, marks, etc., associated with a term cumulative). The example bundle manager 402 may generate a list of cumulative bundles associated with a cumulative bundle manifest file (block 816).

The example user interface 406 will present the generated list of cumulative bundles to a user (block 818) (e.g., the user may see from the user interface 406 that bundle 2 506 of FIG. 4A is cumulative and can be applied for a direct upgrade from version 1 502 to version 3 510). The bundle manager 402 determines if user wants to apply cumulative bundle (block 820).

When the example bundle manager 402 determines the user does want to apply cumulative bundle, it notifies the installation orchestrator 416 to schedule download and apply cumulative bundle on top of determined source version of an SDDC infrastructure component (block 822). If the example user interface 406 determines the user does not want to apply the cumulative bundle, the example bundle manager 402 waits until a new manifest is received to start the process over.

When the example bundle manager 402 receives a new manifest file (block 902), the bundle manager 402 determines the version of the SDDC infrastructure component (block 904). For example, the bundle manager 402 identifies the source version (e.g., the current version the component is running at) associated with the manifest file (e.g., the received manifest file may be associated with ESX, PSC, and/or VCenter of VMware cloud foundation, etc.). The example bundle manager 402 determines if the component is operating at an intermediate version (block 906). For example, the example bundle manager 402 may analyze the manifest file associated with the version, analyze the version number, etc., and if the example bundle manager 402 analyzes a version not supported by the lifecycle manager 228, it may determine it as an intermediate version (e.g., FIG. 4B depicts a DAG 600 in which contains a floating version 1.1 508 which is considered an intermediate version because there is no bundle manifest file associated that could upgrade version 1.1 508 to any version supported by the lifecycle manager 228).

The example version aliaser 410 determines the alias for the intermediate version (block 908). For example, the version aliaser 410 may retrieve information and/or data from the lifecycle repository 404 stored by the alias handler 312 (e.g., the information and/or data could be a look-up table, a static comma separated list, etc. in which alias data is included). The version aliaser 410 may convert the alias determined by the example bundle manager 402 to a base version (block 910). For example, the alias data retrieved from the lifecycle repository 404 may include conversion data in which a specific alias version may be converted to a specific base version (e.g., in the look-up table, static comma separated list, and/or etc., the alias version 1.1 508 of FIG. 4B may be marked under and/or equivalent to base version 1 502 and therefor flagged as base version 1).

When the version aliaser 410 converts the alias version to a base version (block 910), the version is stored in lifecycle repository 404 (block 912). For example, when the alias version is converted to a base version, that version is now associated with a new version number and therefore may need to be stored in order for the lifecycle manager 228 to identify and support that version.

Figure 10A:
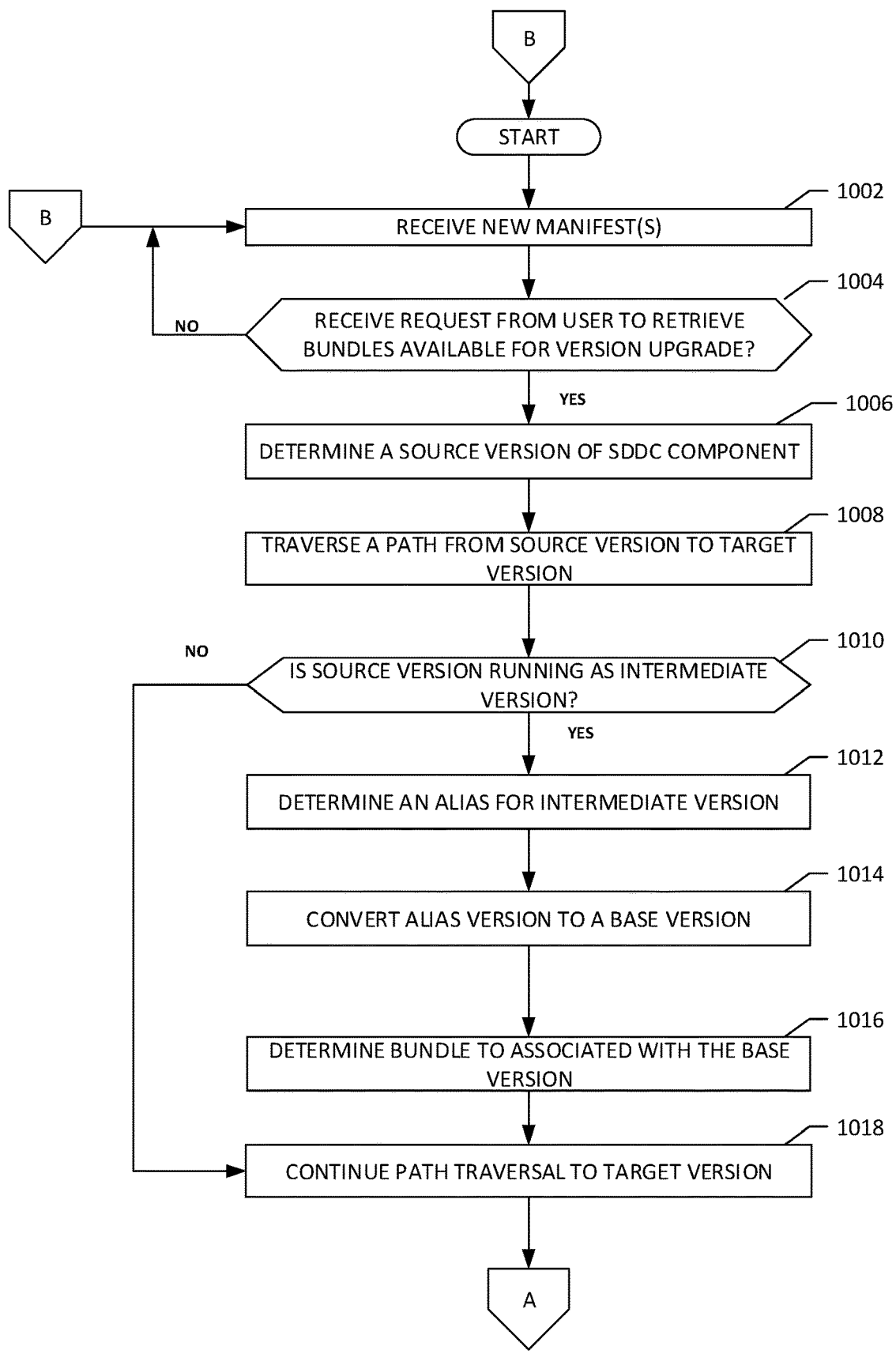
Figure 10B:
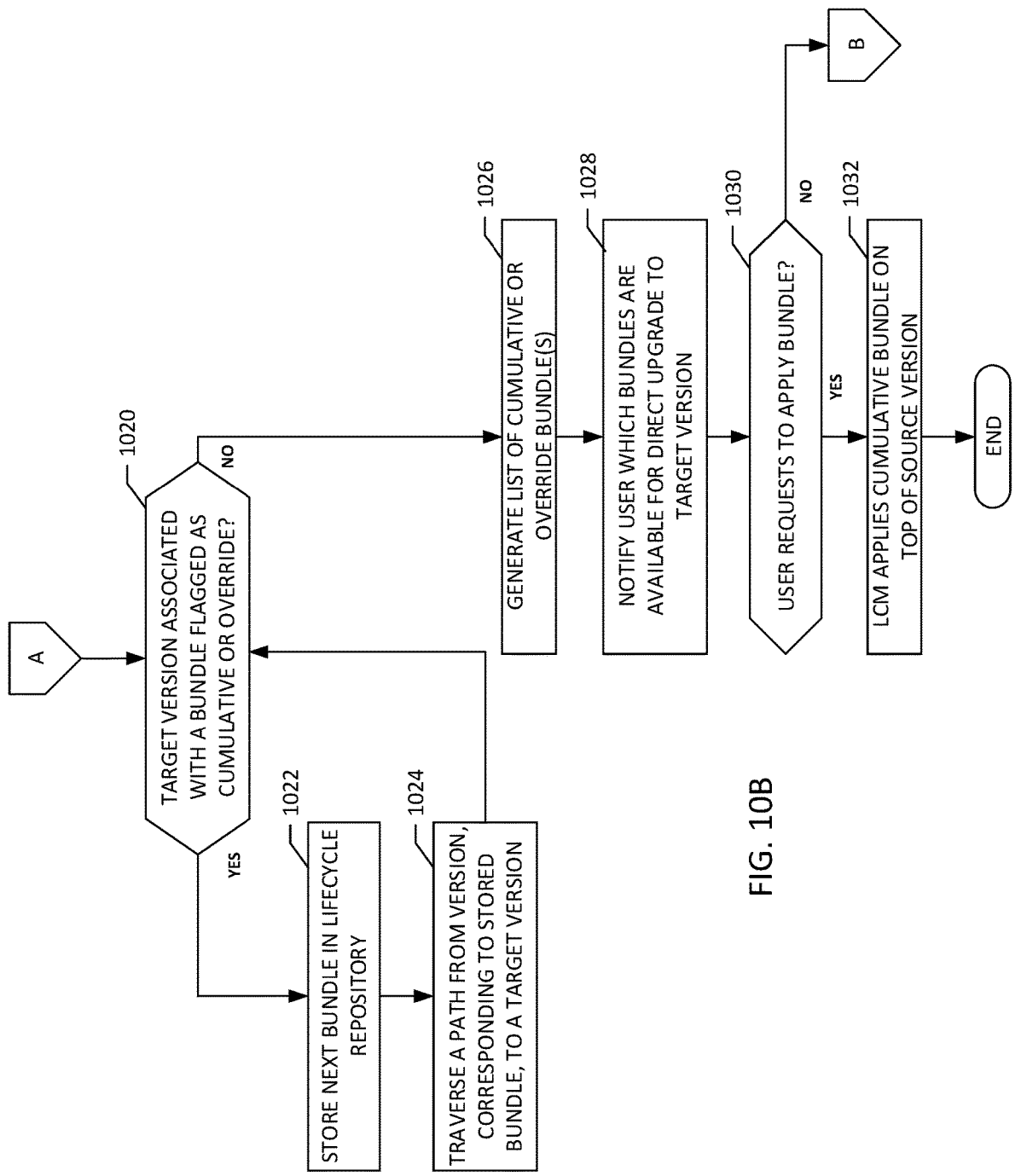

FIGS. 10A and 10B depict an example manner to implement the lifecycle manager 228 utilizing the example path traverser 408 and the example version aliaser 410 of FIG. 4. In FIG. 10A, the process begins when the example bundle manager 402 receives a new manifest(s) (block 1002). When the bundle manager 402 receives a new manifest, it notifies the user interface 406 to retrieve a request from the user to get bundles available for version upgrade. The example user interface 406 receives a request from the user to retrieve bundles available for version upgrade (block 1004). The example user interface 406 notifies the example bundle manager 402 to find a source version of the SDDC component that the manifest file is associated with (block 1006) in response to receiving the request to retrieve bundles available for upgrade.

When the example bundle manager 402 determines the source version of the SDDC component (block 1006), the information is stored in the lifecycle repository and the path traverser 408 is notified. The example path traverser 408 traverses a path (e.g., scan, examine, check, etc., the bundle manifests associated with the component in an order) from the identified source version to a target version (block 1008). For example, the path traverser 408 scans each version the SDDC infrastructure component is running at and determines which versions are available for cumulative upgrade.

In some examples, the path traverser 408 notifies the bundle manager 402 that the source version is intermediate (block 1010). For example, the bundle manager 402 may analyze the manifest file associated with the version, analyze the version number, etc., and if the example bundle manager 402 analyzes a version not supported by the lifecycle manager 228, it may determine it as an intermediate version (e.g., FIG. 4B depicts a DAG 600 in which contains a floating version 1.1 508 which is considered an intermediate version because there is no bundle manifest file associated that could upgrade version 1.1 508 to any version supported by the lifecycle manager 228).

The example version aliaser 410 determines the alias for the intermediate version (block 1012). For example, the version aliaser 410 may retrieve information and/or data from the lifecycle repository 404 stored by the alias handler 312 (e.g., the information and/or data could be a look-up table, a static comma separated list, etc. in which alias data is included). The version aliaser 410 may convert the alias determined by the example bundle manager 402 to a base version (block 1014). For example, the alias data retrieved from the lifecycle repository 404 may include conversion data in which a specific alias version may be converted to a specific base version (e.g., in the look-up table, static comma separated list, and/or etc., the alias version 1.1 508 of FIG. 4B may be marked under and/or equivalent to base version 1 502 and therefore flagged as base version 1).

The example bundle manager 402 determines a bundle associated with the base version previously converted by the version aliaser 410 (block 1014). For example, if the example version aliaser converted the source alias version of the SDDC component to a base version 1 502, the bundle manager 402 would determine that base version 1 502 is associated with bundle manifest file 1 504. The example path traverser 408 continues to traverse a path across bundle manifest file associated with the base version (block 1018).

The process continues to FIG. 10B where the example path traverser 408 determines if the target version is associated with a bundle flagged as cumulative or in the whitelist (block 1020). For example, the example path traverser 408 may analyze the bundle manifest file associated with the target version and check if it was published and/or stored in the bundle overrider 310 of FIG. 3 as a cumulative bundle. If the bundle manifest file corresponding to the target version was flagged as cumulative or in the whitelist, it is stored in the lifecycle repository 404 (block 1022). The example path traverser 408 continues to traverse a path from the stored bundle manifest file corresponding to a target version to a next target version (block 1024) (e.g., if the stored target version is version 2 506 of FIG. 4A, then the next target version along the path is version 3 510). The process of FIG. 10B returns to block 1020 until a target version found is not associated with the bundle flagged as cumulative or override.

At block 1020, if the bundle manifest file is not cumulative, the example bundle manager 402 retrieves bundle manifest files that were stored in the lifecycle repository 404 (e.g., the example bundle manager may analyze information in the lifecycle repository 404 pertaining to flags, marks, etc., associated with a term cumulative). The example bundle manager 402 generates a list of cumulative or override bundles (block 1026) associated with a cumulative bundle manifest file.

The example user interface 406 notifies the user which bundles are available for direct upgrade to target version (block 1028). For example, the user may receive a notification box including a message from the user interface 406 that bundle 2 506 of FIG. 4A is cumulative and can be applied for a direct upgrade from version 1 502 to version 3 510. The example bundle manager 402 determines if user requests to apply cumulative bundle (block 1030). For example, the user may instruct the system via the user interface 406 to apply the bundle or not apply the bundle.

When the example bundle manager 402 determines the user wants to apply the cumulative bundle, it notifies the installation orchestrator 416 to schedule download and apply cumulative bundle on top of determined source version of an SDDC infrastructure component (block 1032). If the example user interface 406 determines the user does not want to apply the cumulative bundle, the process returns to block 1002 (FIG. 10A).

Figure 11:
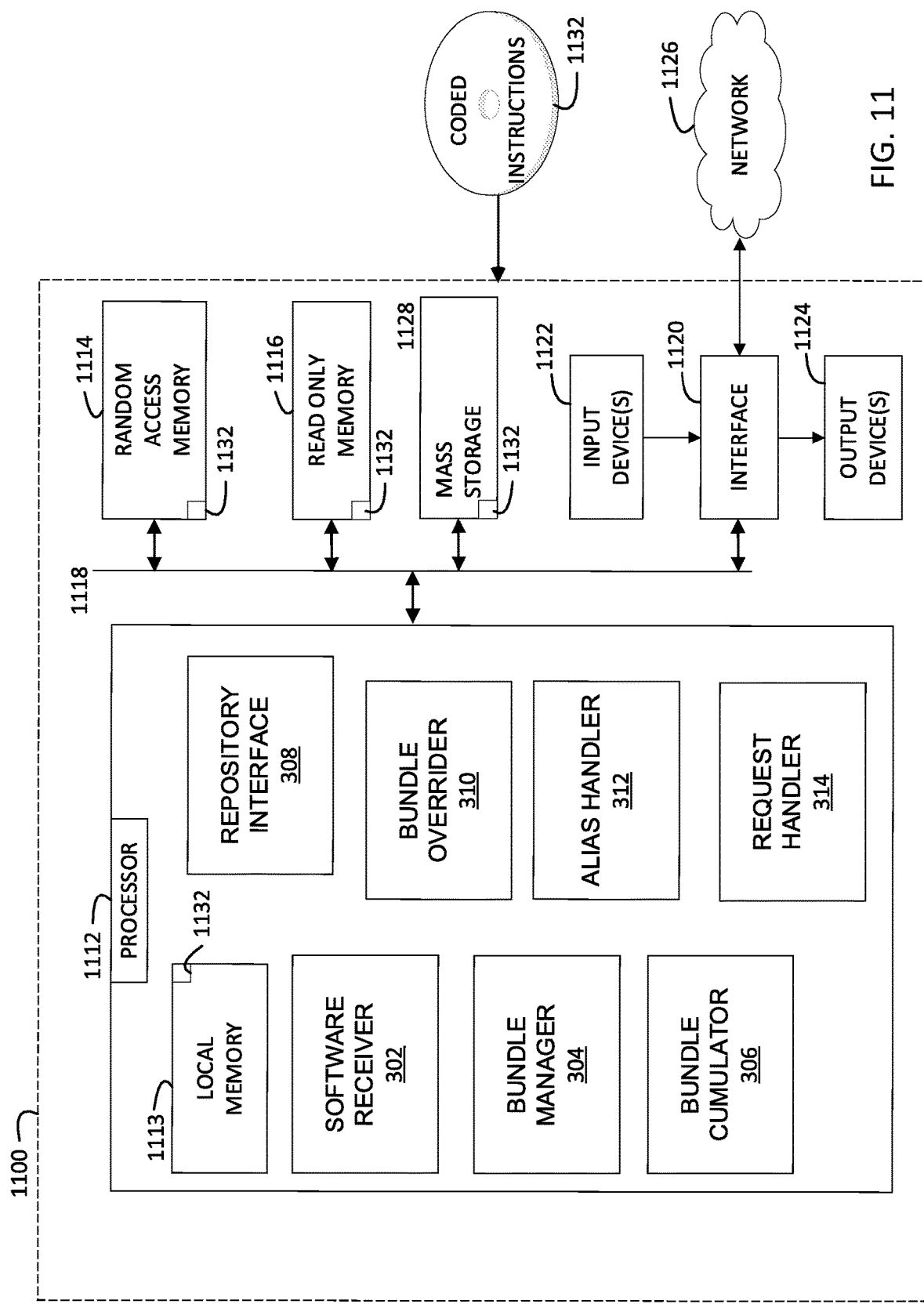
FIG. 11 is a block diagram of an example processing platform capable of executing the example machine-readable instructions of FIG. 7 to implement the example software manager of FIGS. 1A, 1B, and/or 3.

FIG. 11 is a block diagram of an example processor platform 1100 capable of executing the instructions of FIG. 7 to implement the software manager 114 of FIGS. 1A, 1B, and/or FIG. 3. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The example processor 1112 includes the example software receiver 302, the example bundle manager 304, the example bundle cumulator 306, the example repository interface 308, the example bundle overrider 310, the example alias handler 312, and the example request handler 314.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126

(e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIG. 7 may be stored in the mass storage device 1128, in the volatile memory 1114, in the non-volatile memory 1116, and/or on a removable tangible computer readable storage medium such as a CD or DVD.

Figure 12:
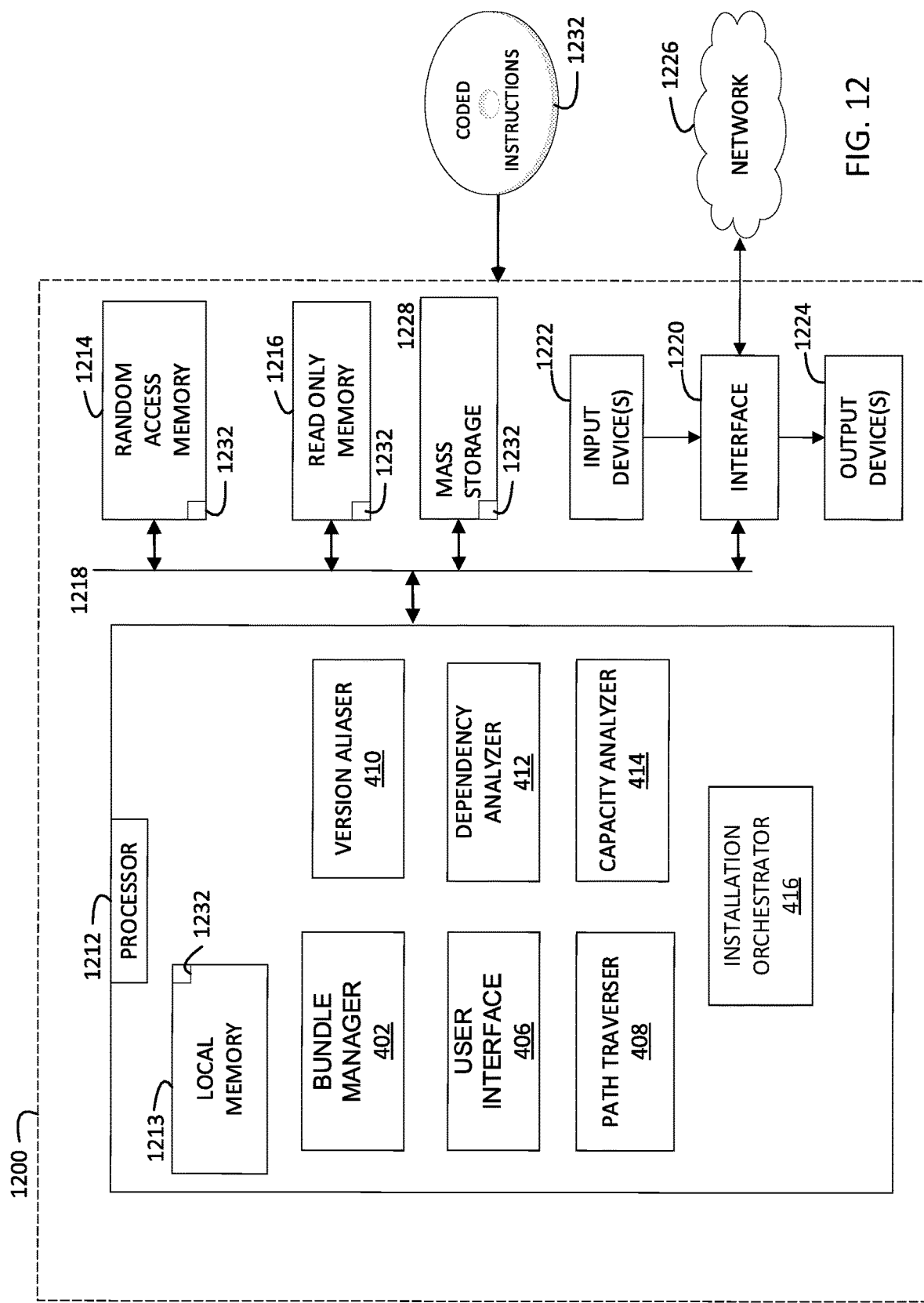
FIG. 12 is a block diagram of an example processing platform capable of executing the example machine-readable instructions of FIGS. 8, 9, 10A, and 10B to implement the example lifecycle manager of FIGS. 2, 4, 5, and/or 6.

FIG. 12 is a block diagram of an example processor platform 1200 capable of executing the instructions of FIGS. 8, 9, 10A, and 10B to implement the lifecycle manager 228 of FIGS. 2, 4, 5, and/or 6. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The example processor 1212 includes the example bundle manager 402, the example user interface 406, the example path traverser 408, the example version aliaser 410, the example dependency analyzer 412, the example capacity analyzer 414, and the example installation orchestrator 416.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 8, 9, 10A, and 10B may be stored in the mass storage device 1228, in the volatile memory 1214, in the non-volatile memory 1216, and/or on a removable tangible computer readable storage medium such as a CD or DVD.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

From the foregoing, it will be appreciated that example methods, apparatus and articles of manufacture have been disclosed that facilitate version aliasing mechanisms and cumulative upgrades for software lifecycle management. The disclosed methods, apparatus and articles of manufacture improve the efficiency of using a computing device by enabling virtual machine users to upgrade their entire virtual infrastructure to the latest versions faster and reduces costs associated with the upgrades. The disclosed methods, apparatus and articles of manufacture also improve the efficiency of using a computing device by enabling the lifecycle management of a virtual machine to update infrastructure components that have been previously updated by mechanisms outside of the lifecycle manager. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for upgrading a data center infrastructure component, the method comprising:
   traversing, by executing an instruction with a processor, a path from a second manifest file to a first manifest file in a directed graph to identify a plurality of software updates, the first and second manifest files corresponding to the data center infrastructure component;
   determining, by executing an instruction with the processor, the second manifest file is not supported by the processor;
   converting, by executing an instruction with the processor, the second manifest file to a base version of the second manifest file based on an alias of the unsupported second manifest file, the base version supported by the processor;
   cumulating, by executing an instruction with the processor, the plurality of software updates identified in the first manifest file with the plurality of software updates identified in the base version of the second manifest file to generate a cumulative manifest file, the base version of the second manifest file corresponding to a version older than a version corresponding to the first manifest file; and
   flagging the cumulative manifest file as cumulative, the cumulative manifest file including the plurality of software updates of the first and second manifest files that update the second manifest file to the first manifest file.

2. A method as defined in claim 1, further including:
   receiving, from a user interface, an instruction to apply the plurality of software updates identified in the cumulative manifest file; and
   scheduling, by executing an instruction with the processor, installation of the plurality of software updates identified in the cumulative manifest file.

3. A method as defined in claim 1, wherein cumulating the plurality of software updates identified in the first manifest file with the plurality of software updates identified in the second manifest file happens at a software manager level.

4. A method as defined in claim 1, further including cumulating a plurality of manifest files.

5. A method as defined in claim 4, wherein the plurality of manifest files correspond to a plurality of software updates previously received by a software manager but not downloaded by a lifecycle manager.

6. A method as defined in claim 4, further including publishing the cumulative manifest file.

7. A method as defined in claim 1, wherein traversing the path is to identify one or more manifest files to be cumulated and one or more manifest files to not be cumulated.

8. A method as defined in claim 7, further including identifying a manifest file as cumulative if the manifest file is included on a whitelist.

9. A method as defined in claim 1, further including presenting a user an option to not apply a plurality of software updates identified in a cumulative manifest file.

10. A tangible computer readable storage medium comprising instructions that, when executed, cause a machine to at least:
    traverse, by executing an instruction with a processor, a path from a second manifest file to a first manifest file in a directed graph to identify a plurality of software updates, the first and second manifest files corresponding to a data center infrastructure component;
    determine, by executing an instruction with the processor, the second manifest file is not supported by the processor;
    convert, by executing an instruction with the processor, the second manifest file to a base version of the second manifest file based on an alias of the unsupported second manifest file, the base version supported by the processor;
    cumulate the plurality of software updates identified in the first manifest file with a plurality of software updates identified in the base version of the second manifest file to generate a cumulative manifest file, the first manifest file corresponding to a new version and the base version of the second manifest file corresponding to a version older than a version corresponding to the first manifest file; and
    flag the cumulative manifest file as cumulative, the cumulative manifest file including the plurality of software updates that update the second manifest file to the first manifest file.

11. A tangible computer readable storage medium as defined in claim 10, wherein the instructions, when executed, cause the machine to:
    receive, from a user interface, an instruction to apply the plurality of software updates identified in the cumulative manifest file; and
    schedule installation of the plurality of software updates identified in the cumulative manifest file.

12. A tangible computer readable storage medium as defined in claim 10, wherein the instructions, when executed, cause the machine to cumulate a plurality of manifest files.

13. A tangible computer readable storage medium as defined in claim 10, wherein the instructions, when executed, cause the machine to publish the cumulative manifest file.

14. A tangible computer readable storage medium as defined in claim 10, wherein the instructions, when executed, cause the machine to traverse a path to identify one or more manifest files to be cumulated and one or more manifest files to not be cumulated.

15. A tangible computer readable storage medium as defined in claim 10, wherein the instructions, when executed, cause the machine to present a user with an option to not apply a plurality of software updates identified in a cumulative manifest file.

16. An apparatus comprising:
    a bundle manager to receive a software update from a software/hardware supplier(s), the software update corresponding to a new version of a data center infrastructure component and identified in a first manifest file;
    a path traverser to traverse a path from a second manifest file corresponding to a current version of the data center infrastructure component to the first manifest file in a directed graph, the path to identify a plurality of software updates;

a version aliaser to, in response to determining the second manifest file is not supported by a processor, convert the second manifest file to a base version of the second manifest file based on an alias of the unsupported second manifest file, the base version supported by the processor;

a bundle cumulator to:
  cumulate the software update identified in the first manifest file with the plurality of software updates identified in the path from the base version of the second manifest file to the first manifest file to generate a cumulative manifest file; and
  flag the cumulative manifest file as cumulative, the cumulative manifest file including the plurality of software updates that update the current version of the data center infrastructure component to the new version.

17. An apparatus as defined in claim 16, further including:
  a user interface to apply the plurality of software updates identified in the cumulative manifest file; and
  an installation orchestrator to install the plurality of software updates identified in the cumulative manifest file.

18. An apparatus as defined in claim 16, wherein the bundle cumulator cumulates a plurality of manifest files.

19. An apparatus as defined in claim 16, further including a repository interface to publish a cumulative manifest file.

20. An apparatus as defined in claim 16, wherein a bundle overrider contains a static comma separated list of previous manifest files that can be identified as cumulative.

21. An apparatus as defined in claim 16, wherein the path traverser traverses the path to identify one or more manifest files to be cumulated and one or more manifest files to not be cumulated.

22. An apparatus as defined in claim 16, wherein a user interface presents an option to a user to not apply a plurality of software updates identified in a cumulative manifest file.

* * * * *